United States Patent
Gong

(10) Patent No.: US 10,606,659 B2
(45) Date of Patent: Mar. 31, 2020

(54) ACQUIRING LOCATION INFORMATION FOR LOGICAL PARTITION WITHIN VIRTUAL MACHINE

(71) Applicant: Alibaba Group Holding Limited, George Town (KY)

(72) Inventor: Mingxian Gong, Hangzhou (CN)

(73) Assignee: Alibaba Group Holding Limited (KY)

( * ) Notice: Subject to any disclaimer, the term of this patent is extended or adjusted under 35 U.S.C. 154(b) by 335 days.

(21) Appl. No.: 15/400,985

(22) Filed: Jan. 7, 2017

(65) Prior Publication Data

US 2017/0199753 A1 Jul. 13, 2017

(30) Foreign Application Priority Data

Jan. 8, 2016 (CN) .......................... 2016 1 0013031

(51) Int. Cl.
| | |
|---|---|
| *G06F 9/455* | (2018.01) |
| *G06F 9/50* | (2006.01) |
| *G06F 3/06* | (2006.01) |
| *G06F 11/20* | (2006.01) |
| *G06F 12/08* | (2016.01) |

(52) U.S. Cl.
CPC ............ *G06F 9/5077* (2013.01); *G06F 3/067* (2013.01); *G06F 3/0607* (2013.01); *G06F 3/0632* (2013.01); *G06F 3/0664* (2013.01); *G06F 9/45558* (2013.01); *G06F 11/20* (2013.01); *G06F 12/08* (2013.01); *G06F 9/45533* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 6,145,028 | A | 11/2000 | Shank |
| 8,869,145 | B1 | 10/2014 | Barve |
| 2002/0073268 | A1* | 6/2002 | Peloquin ............... G06F 3/0607 711/6 |
| 2004/0205380 | A1 | 10/2004 | Black |
| 2004/0230972 | A1 | 11/2004 | Donovan |
| 2005/0102330 | A1 | 5/2005 | Beeston |
| 2007/0061441 | A1 | 3/2007 | Landis |
| 2009/0307690 | A1* | 12/2009 | Logan ................. G06F 11/0712 718/1 |
| 2010/0088579 | A1 | 4/2010 | Hafner |
| 2011/0173353 | A1* | 7/2011 | Bauman .............. G06F 9/45558 710/28 |
| 2011/0271140 | A1 | 11/2011 | Katano |

(Continued)

*Primary Examiner* — Kenneth Tang
(74) *Attorney, Agent, or Firm* — Van Pelt, Yi & James LLP

(57) ABSTRACT

Acquiring location information is presented, including acquiring disk location information for logical partitions, the logical partitions pertaining to a virtual machine, matching the disk location information corresponding to the logical partitions against location information for at least one virtual disk stored on a physical device, in the event that the disk location information matches the location information for the at least one virtual disk, determining the location information for the at least one virtual disk obtained by the matching to be the disk location information for the logical partitions in the physical device, and outputting the location information for the at least one virtual disk.

13 Claims, 26 Drawing Sheets

(56) References Cited

U.S. PATENT DOCUMENTS

| | | |
|---|---|---|
| 2012/0066678 A1* | 3/2012 | Pafumi ............... G06F 9/45558 718/1 |
| 2012/0131576 A1 | 5/2012 | Hatta |
| 2013/0007743 A1 | 1/2013 | Sekiguchi |
| 2014/0101657 A1* | 4/2014 | Bacher ................ G06F 9/45558 718/1 |
| 2014/0115175 A1 | 4/2014 | Lublin |
| 2014/0237211 A1 | 8/2014 | Goel |

* cited by examiner

100

2500

600

700

1400

ACQUIRING LOCATION INFORMATION FOR LOGICAL PARTITION WITHIN VIRTUAL MACHINE

CROSS REFERENCE TO OTHER APPLICATIONS

This application claims priority to People's Republic of China Patent Application No. 201610013031.X entitled A Method and A Device for Acquiring Location Information for Logical Partitions in Virtual Machines filed Jan. 8, 2016 which is incorporated herein by reference for all purposes.

FIELD OF THE INVENTION

The present invention relates to acquiring location information for logical partitions in virtual machines.

BACKGROUND OF THE INVENTION

Typically, a user cloud host has several virtual disks. A virtual disk is a software component that emulates an actual disk storage device. The virtual disks can be formed by a local physical machine, or the virtual disks can be formed by cloud storage devices. Also, the virtual disks can be formed by a disk snapshot. In practice, the sizes of virtual disks in a system are often equal (for example, the sizes of the virtual disks when they are created are typically of fixed types and thus are typically the same). When the virtual disks of equal size are simultaneously mounted onto a user cloud host, it can be difficult to identify which specific virtual disks in a physical machine system correspond to the logical partitions in a user virtual machine (VM). In other words, the user has trouble determining mapping relationships of logical partitions to the virtual disks. This confusion affects the backup operations of key data disks and can lead to data back-up omissions, which in turn can put data disaster recovery at risk.

BRIEF DESCRIPTION OF THE DRAWINGS

Various embodiments of the invention are disclosed in the following detailed description and the accompanying drawings.

DETAILED DESCRIPTION

Figure 1:
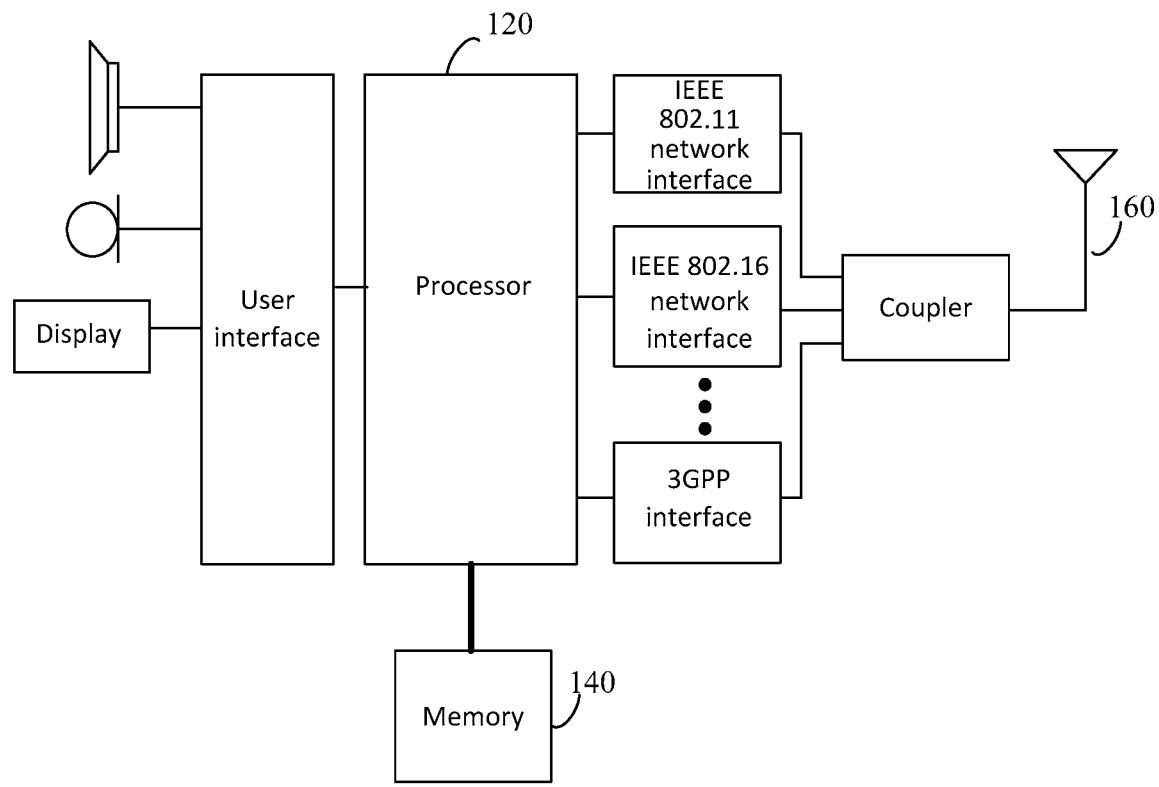
FIG. 1 is a computer terminal hardware structural diagram of an embodiment of a computer terminal for acquiring location information for logical partitions in virtual machines.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The terms involved in the present application are explained as follows:

VM: virtual machines, also called virtual hosts, are multiple hosts simulated on a physical server based on virtualization technology. Each virtual host is independent of each other and has its own operating system and logically independent memory, central processing unit (CPU), network card, and other such devices. In terms of software applications, using virtual machines is typically no different from using physical servers. Processes for generating virtual machines include: using a hypervisor program to virtually partition or simulate physical resources or to allocate the physical resources to different virtual machines. These virtual machines share computer resources and thus achieve increased utilization of physical resources. Examples of hypervisor programs include: VMware®, KVM®, Hyper-V®, and Xen®, which are used to create multiple virtual machines on a server.

Logical partitions: logical partitions correspond to disk identifiers displayed in a virtual machine resource manager. For example, the logical partitions commonly used include C:, D:, E:, F:, . . . , Z:.

Location information: when a peripheral component interconnect (PCI) device is mounted onto a computer, the PCI device has a corresponding piece of location information (such as disk location information). This location information can include three elements (e.g., bus number, device number, and function number).

The embodiments of the processes disclosed below can be performed on a mobile terminal, a computer terminal, or similar operating device. The processes can be implemented in software using programming languages such as C, C++, etc.

FIG. 1 is a computer terminal hardware structural diagram of an embodiment of a computer terminal for acquiring location information for logical partitions in virtual machines. As shown in FIG. 1, the computer terminal 100 comprises a processor 120 (the processor 120 can include a processing device such as a microprocessor, a microcontroller (MCU), programmable logic device, or a field-programmable gate array (FPGA)), memory 140 for storing data, and a transmission module 160 for communication functions. The computer terminal 100 can also include a display and user interface.

The memory 140 can be used to store application programs and modules of application software, e.g., a program instruction/module corresponding to a process of acquiring location information for location partitions in virtual machines. By running software programs and modules stored in the memory 140, the processor 120 executes various function applications and data processing, i.e., implements the acquiring of the location information for the logical partitions in the virtual machines, as described below. The memory 140 can include high-speed random access memory such as, for example, dynamic random access memory. The memory 140 can further include non-volatile memory, such as one or more magnetic storage devices, flash memory, or other non-volatile solid-state memory. In some embodiments, the memory 140 can further include memory that is remotely located relative to the processor 120. Such remote memory can be connected to the computer terminal 100 via a network. Examples of the network comprise but are not limited to the Internet, corporate intranets, local area networks, mobile communication networks, and any combination thereof.

The transmission module 160 is configured to receive or send data via a network. Specific examples of the network can comprise wireless networks provided by communication suppliers for the computer terminal 100. In some embodiments, the transmission module 160 includes a network interface controller (NIC), which can connect to other networks via a base station and thereby communicate with the Internet. For example, the transmission module 160 can be implemented as a radio frequency (RF) card, a WiFi card, etc. configured to communicate with the network wirelessly, or an Ethernet card configured to communicate with the network via a wireline.

Figure 2A:
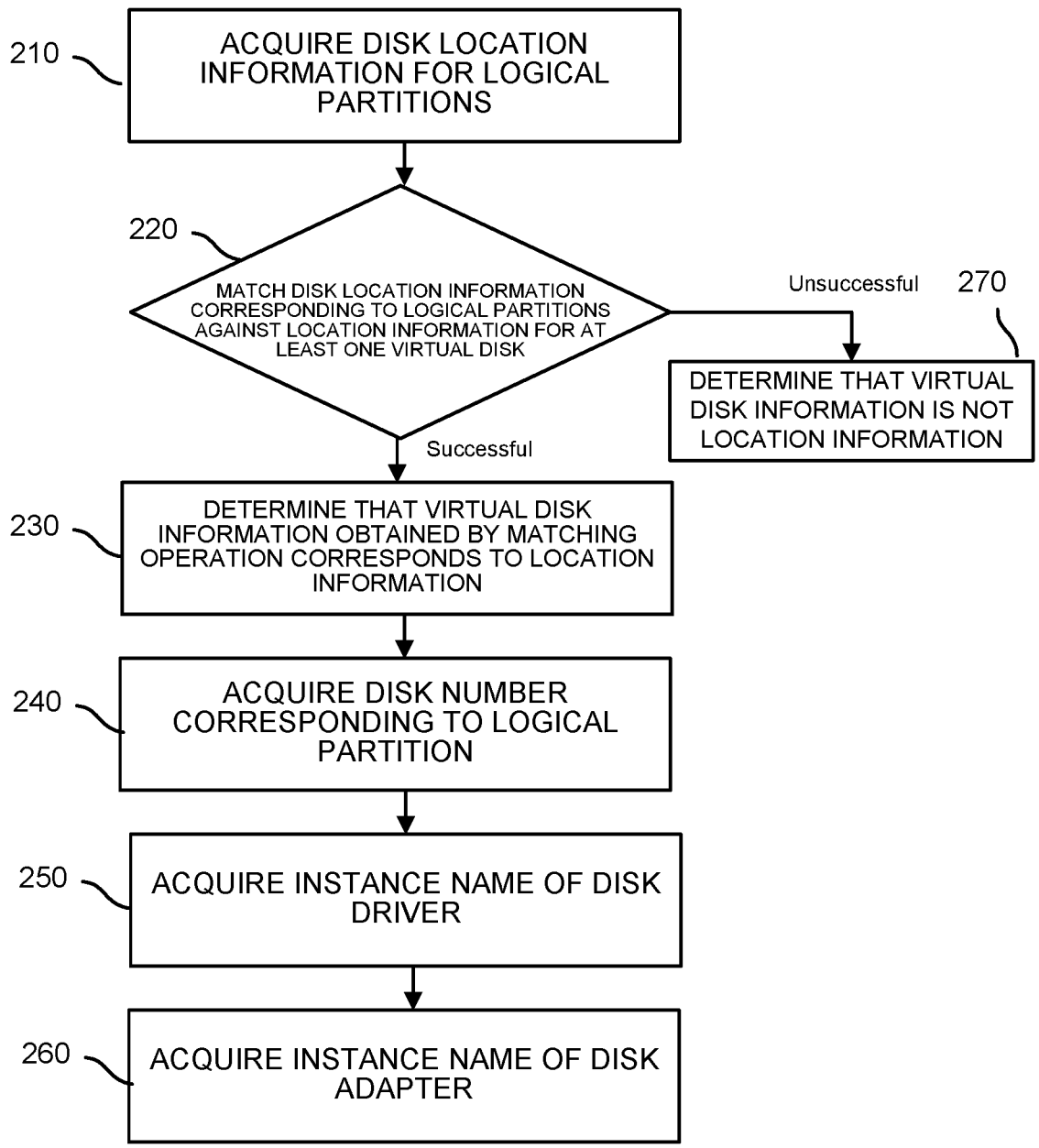
FIG. 2A is a flowchart of an embodiment of a process for acquiring location information for logical partitions in virtual machines.

FIG. 2A is a flowchart of an embodiment of a process for acquiring location information for logical partitions in virtual machines. In some embodiments, the process 200 is performed by the computer terminal 100 of FIG. 1 and comprises:

In 210, the computer terminal acquires disk location information for logical partitions within virtual machines. Establishing a logical partition within a virtual machine and then acquiring disk location information of the logical partition are understood by one of ordinary skill in the art. For example, the acquiring of the disk location information can be performed via an application programming interface (API) call. In some embodiments, the disk location information corresponds to location information for virtual disks corresponding to logical partitions in the virtual machines.

The virtual machines can be virtual devices installed on physical machines or network equipment. The disk location information can be location information for virtual disks to which logical partitions within the virtual machines are subordinate. These virtual machines can be virtual devices generated on the physical machines or the network equipment, and the virtual machines can be created by using hypervisor programs such as VMware, KVM, Hyper-V, and Xen. In some embodiments, a virtual machine typically has several virtual disks. These virtual disks can be formed by a local physical machine, or the virtual disks can be formed by cloud storage devices. In some embodiments, the virtual disks are from a disk snapshot. A disk snapshot corresponds to a set of reference markers at a particular point in time.

Using a virtual machine installed on a local physical machine as an example, viewing the current disk information for the physical disks of the local physical machine in the virtual machine's disk manager is possible. After the virtual disks of the virtual machine are partitioned into at least one logical partition, determining the physical disk corresponding to the virtual disk where a logical partition is located is possible.

In 220, the computer terminal matches the disk location information corresponding to the logical partitions against the location information for at least one virtual disk stored on a physical device (e.g., a physical machine, network equipment, etc.). In some embodiments, the location information for the at least one virtual disk corresponds to a storage path, for example E:/download, generated after the virtual machine is installed on the physical machine or network equipment. In the event that the matching is successful, control passes to 230; otherwise, control passes to 270.

In order to perform operation 220, after the virtual machine is installed on the physical machine or network equipment, one piece of the location information for the at least one virtual disk corresponding to the virtual machine is to be generated locally. The virtual disk location information is used to describe the storage path of the virtual machine on the physical machine or network equipment. In the event that the virtual machine is started, the computer terminal can access the virtual machine's disk manager, and learn in which virtual disk the current virtual logical partition is located and the disk location information for the virtual disk. Since the physical location of the virtual disk on the physical machine or network equipment can be determined based on a virtual disk identifier, the virtual disk identifier corresponds to the disk location information relating to the logical partitions on the virtual machine and is used to look up location information for multiple virtual disks. In other words, the virtual disk identifier relates to the location information of the virtual disks. If virtual disk location information matching the disk location information is found, then determining the physical storage path of the current logical partition on the physical machine or network equipment is possible.

For an operating system (such as Windows), virtual devices correspond to actual devices. As long as the virtual device corresponds to a PCI device, the virtual device is to generate one piece of corresponding location information when the virtual device is mounted onto the computer. The location information can be accessed on either a physical machine or a virtual machine, and the correspondence of location information on the physical machine and the location information on the virtual machine is one-to-one.

Therefore, since the virtual disks simulated by a virtual machine correspond to PCI devices, the virtual machine can access the disk location information for a logical partition. Moreover, a physical machine or network equipment can access at least one piece of already stored virtual disk location information. If the accessed physical disk location information has a one-to-one correspondence with the virtual disk location information for a certain virtual disk, then the logical partition has a subordination relationship (e.g., N-to-one mapping relationship) with the virtual disk.

As an example, in order to determine the subordination relationship of a designated logical partition within a virtual machine with a corresponding virtual disk in a physical machine or network equipment, the computer terminal can match the disk location information corresponding to the logical partition against the location information for at least one virtual disk already stored on the physical machine or network equipment.

In 230, in the event that the matching is successful, the computer terminal determines that the virtual disk information obtained by the matching operation corresponds to the location information for the virtual machine logical partitions in the physical machine or the network equipment.

In 230, in the event that the match is successful, i.e., the virtual disk location information matching the logical partition is found, a determination can be made that the virtual disk corresponding to the virtual disk location information obtained through the matching operation is the corresponding virtual disk to which the logical partition is subordinate.

In 270, in the event that the matching is unsuccessful, a determination is made that the virtual disk information currently obtained by the matching operation is not the location information of the virtual machine logical partition in the physical machine or the network equipment. Moreover, the virtual disk corresponding to the virtual disk location information currently obtained by the matching operation is not a virtual disk subordinate to the logical partition.

In process 200, when a virtual machine has several virtual disks of the same size, it can be difficult to identify, or easy to confuse, mapping relationships of logical partitions in virtual machines having virtual disks in a physical machine or network equipment. To reduce the difficulty of identifying the mapping relationships, the computer terminal can first acquire the disk location information for virtual machine logical partitions within the virtual machines and already stored location information for at least one virtual disk in a physical machine or network equipment, and then match the acquired disk location information against the virtual disk location information. Then, if the match is successful, the computer terminal can determine that the matched virtual disk location information is the location information for the virtual machine logical partition in the physical machine or network equipment and thus locate a mapping relationship between the designated logical partition and the corresponding virtual disk. In some embodiments, virtual disks correspond to PCI devices, and each PCI device generates one piece of corresponding location information when mounted onto a computer. Moreover, the location information can be accessed in either a physical machine or in a virtual machine, and the correspondence is one-to-one. Therefore, in process 200, the computer terminal can first acquire the disk location information for virtual machine logical partitions within the virtual machines and already stored location information for at least one virtual disk in a physical machine or network equipment, and then match the acquired disk location information with the virtual disk location information. The computer terminal can make use of the one-to-one correspondence of the results of accessing location information generated when the virtual disk was mounted on the virtual machine in the virtual machine versus the physical machine, to achieve the following when two pieces of location information are successfully matched: determining that the matched virtual disk location information is the location information of the virtual machine logical partition in the physical machine or the network equipment. Not only can process 200 lower the difficulty of identifying the mapping relationship of the designated logical partition with the corresponding virtual disk, but process 200 also avoids confusing logical partitions with their corresponding virtual disks. Therefore, process 200 can reduce or even eliminate the hidden risks involved in data disaster recovery. Accordingly, the hidden risks of data disaster recovery resulting from the difficulty in identifying, or the ease in confusing, mapping relationships of logical partitions with virtual disks are reduced.

Figure 2B:
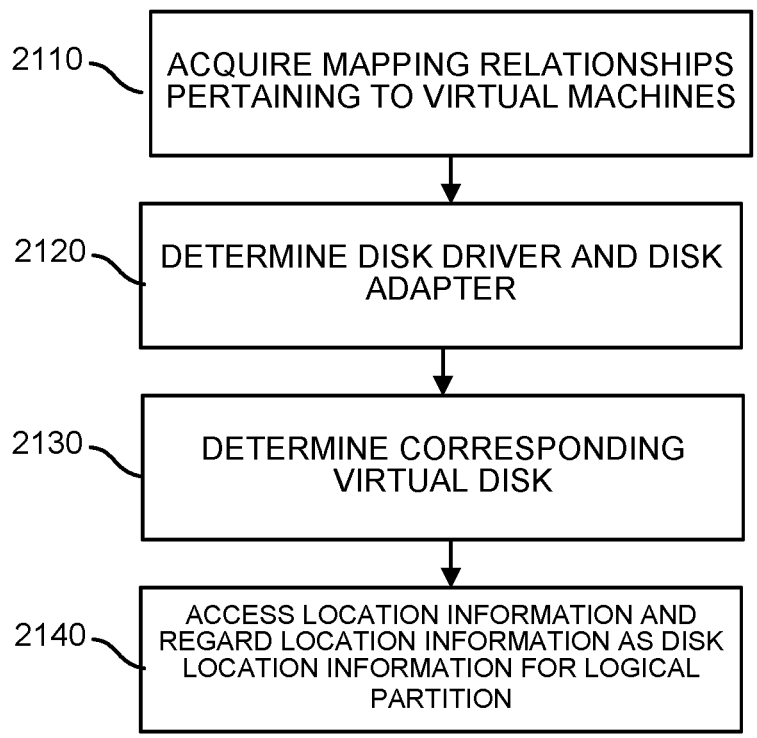
FIG. 2B is a flowchart of an embodiment of a process for acquiring location information for logical partitions in virtual machines.

FIG. 2B is a flowchart of an embodiment of a process for acquiring location information for logical partitions in virtual machines. In some embodiments, the process 2100 is an implementation of operation 210 of FIG. 2A and comprises:

In 2110, the computer terminal acquires mapping relationships pertaining to virtual machines. A mapping relationship of each logical partition with a corresponding disk driver exists and a mapping relationship of each disk driver with a corresponding disk adapter exists. As used herein, a disk driver refers to a program (typically software and/or firmware program) that controls a physical disk and enables it to communicate with the host system to which the physical disk is coupled. A disk adapter (also referred to as a host bus adapter) refers to the controller circuit and its associated program that facilitates input/output (I/O) processing and physical connectivity between the host system and the physical disk.

In 2120, the computer terminal determines, based on the logical partition and the mapping relationships, a disk driver having a mapping relationship with the logical partition, and a disk adapter having a mapping relationship with the disk driver. For example, as shown below in Table 1 and FIG. 4, logical partitions C: and D: have a mapping relationship with disk driver 0, and disk adapter 0 has a mapping relationship with disk driver 0. In another example, as shown below in Table 1 and FIG. 4, logical partitions E: and F: have a mapping relationship with disk driver 1, and disk adapter 1 has a mapping relationship with disk driver 1. In yet another example, as shown below in Table 1 and not shown in FIG. 4, logical partitions G: and H: have a mapping relationship with disk driver 2, and disk adapter 2 has a mapping relationship with disk driver 2.

In 2130, the computer terminal determines, based on the disk adapter corresponding to the logical partition, the corresponding virtual disk of the logical partition in the virtual machine.

In 2140, the computer terminal accesses the location information for the virtual disk corresponding to the logical partition and regards the location information as disk location information for the logical partition in the virtual machine.

Using the Windows operating system as an example, relationships between logical partitions, disk drivers, and disk adapters within virtual machines satisfy preset subordination relationships (i.e., mapping relationships). In another example, every relationship between each logical partition and its corresponding disk driver can be mapped via attributes shared by both of them. By the same token, a relationship between each disk driver and its corresponding disk adapter can be mapped via the attributes shared by both of them. In other words, after two layers of mapping have occurred, mapping first from the designated logical partition to the corresponding disk driver and then mapping from the disk driver to the corresponding disk adapter are possible.

With process 2100, the layers of mapping relationships between logical partitions, disk drivers, and disk adapters in a Windows operating system are put to use, thus simplifying the process of acquiring disk location information for logical partitions in virtual machines and increasing the accuracy of the acquiring results.

In some embodiments, a logical partition comprises: a logical partition disk identifier and a logical partition disk number; a disk driver comprises: a logical partition disk number and a disk driver instance name; a disk adapter comprises: a disk driver instance name and disk location information. In some embodiments each logical partition determines the mapping relationship with the corresponding disk driver based on the disk number, and each disk driver determines the mapping relationship with the corresponding disk adapter based on the instance name.

The attributes (these attributes are unique) shared by the logical partitions and disk drivers correspond to the disk numbers of the logical partitions, and the attributes shared by disk drivers and disk adapters correspond to instance names of the disk drivers. Therefore, in the event that the mapping relationship of the logical partition with its corresponding disk driver is determined, checking whether the disk numbers are consistent is possible. In the event that the disk numbers are consistent, then the two disk numbers satisfy the mapping relationship requirement. If the disk numbers are not consistent, then the two disk numbers do not satisfy the mapping relationship requirement. On the other hand, when the mapping relationship of the disk driver with the disk adapter is determined, checking whether the two disk numbers satisfy the mapping relationship requirement is possible. If the two disk numbers are not consistent, then the two disk numbers do not satisfy the mapping relationship requirement.

Figure 3:
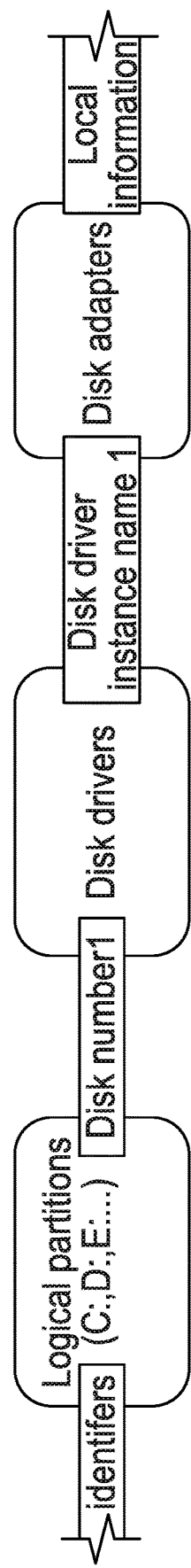
FIG. 3 is a schematic diagram of an embodiment of a system for acquiring disk location information for virtual machine logical partitions within virtual machines.

FIG. 3 is a schematic diagram of an embodiment of a system for acquiring disk location information for virtual machine logical partitions within virtual machines. Assuming that a virtual machine has logical partitions C:, D:, E:, . . . , in some embodiments, C:, D:, and E: are the disk identifiers corresponding to the corresponding logical partitions. Using C: as an example, suppose that the disk number of the logical partition is Disk number 1, in which case the disk number of the disk driver having a mapping relationship with this logical partition is also Disk number 1. In an operating system (OS) such as, for example, Windows, to support simultaneous mounting of multiple disks, a disk number is assigned to each disk at initialization time. Assuming that the instance name (e.g., a name assigned to a process executing in the virtual machine) of the disk driver is name1, then the instance name of the disk adapter having a mapping relationship with the disk driver is also name1. Thus, the disk adapter having the instance name of name1 can be found from the logical partition having the disk identifier of C:. The disk location information for the logical partition in the virtual machine can be then accessed.

In some embodiments, the shared attributes of Windows operating system logical partitions and disk drivers and the shared attributes of disk drivers and disk adapters are used to quickly and accurately determine the mapping relationships of logical partitions with disk drivers and of disk drivers with disk adapters.

In some embodiments, referring to FIG. 2A, before a disk number of each logical partition is used to determine the mapping relationship with the corresponding disk driver, process 200 of FIG. 2A further includes: in 240, the computer terminal acquires the disk number corresponding to the logical partition.

Figure 2C:
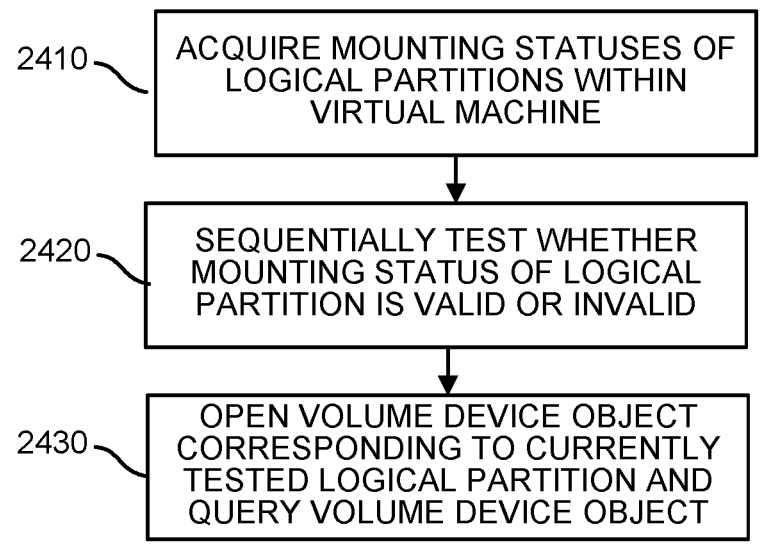
FIG. 2C is a flowchart of an embodiment of a process for acquiring a disk number corresponding to a logical partition.

FIG. 2C is a flowchart of an embodiment of a process for acquiring a disk number corresponding to a logical partition. The process 2400 is an implementation of operation 240 of FIG. 2A and comprises:

In 2410, the computer terminal acquires mounting statuses of all logical partitions within the virtual machine.

In 2420, the computer terminal sequentially tests whether a mounting status of each logical partition is valid or invalid until testing of all logical partitions is completed.

In 2430, in the event that a currently tested logical partition is valid, the computer terminal opens a volume device object corresponding to the currently tested logical partition and queries the volume device object to obtain the disk number corresponding to the currently tested logical partition.

In some embodiments, in the event that any currently tested logical partition is invalid, the computer terminal tests whether a mounting status of a next logical partition is valid or invalid. In some embodiments, a mounting status relates to whether a logical partition is connected to the operating system, so that the logical partition is useable for storage.

After each logical partition is normally mounted on a virtual machine, i.e., when the mounting status is valid, a corresponding disk number is generated in the corresponding volume device object. In the event that each logical partition is not normally mounted on a virtual machine or is not mounted on a virtual machine, i.e., when the mounting status is invalid, a corresponding disk number is not generated in the corresponding volume device object. Therefore, when the disk number corresponding to a logical partition is acquired, the mounting status of the logical partition can be first acquired and tested to determine whether the mounting status of the logical partition is valid or invalid. When the mounting status of the logical partition is valid, the volume device object corresponding to the logical partition is opened and queried to obtain the disk number corresponding to the logical partition. In the event that the mounting status of the logical partition is invalid, the above operation is repeated, and the next logical partition undergoes similar processing.

In some embodiments, the disk number acquisition operation is performed only for logical partitions having a mounting status of valid, and logical partitions having a mounting status of invalid do not undergo processing. Consequently, program execution time can be reduced, and programs can be executed faster and more efficiently.

In some embodiments, referring back to FIG. 2A, before each disk driver uses an instance name to determine the mapping relationship with the corresponding disk adapter, process 200 of FIG. 2A further includes:

In 250, the computer terminal acquires an instance name of the disk driver.

Figure 2D:
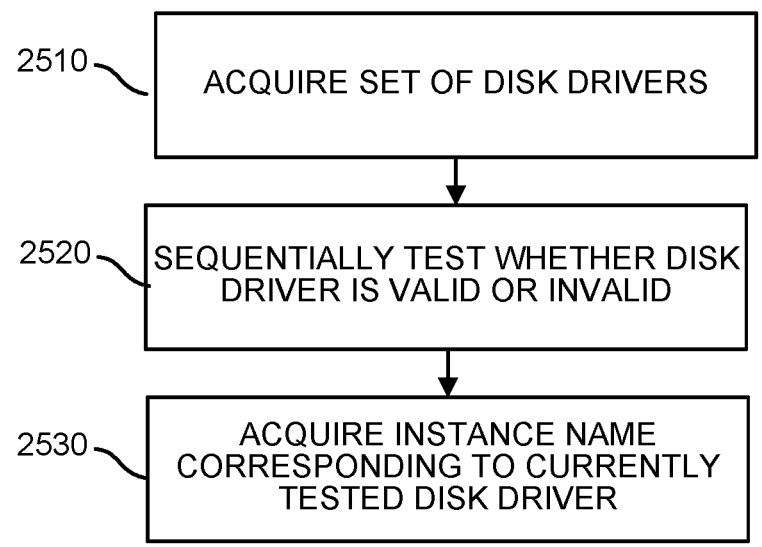
FIG. 2D is a flowchart of an embodiment of a process for acquiring an instance name of a disk driver.

FIG. 2D is a flowchart of an embodiment of a process for acquiring an instance name of a disk driver. The process 2500 is an implementation of operation 250 of FIG. 2A and comprises:

In 2510, the computer terminal acquires a set of all disk drivers in a virtual machine.

In 2520, the computer terminal sequentially tests whether each disk driver is valid or invalid until testing of all disk drivers is completed.

In 2530, if any currently tested disk driver has a valid status, the computer terminal acquires an instance name corresponding to the currently tested disk driver.

In some embodiments, in the event that the disk driver can be used, that means the disk driver is valid, and in the event that the disk driver cannot be used, that means the disk driver is invalid. Therefore, to determine the validity of a disk driver is to determine whether the disk driver can be used. Therefore, in the event that the instance name corresponding to a disk driver is acquired, a status of the disk driver can be first acquired and tested to determine whether the disk driver is valid or invalid. When the disk driver is valid, the instance name of the currently tested disk driver is acquired. If the disk driver is invalid, the operation above is repeated, and the next disk driver undergoes similar processing.

In some embodiments, the process 2500 for acquiring an instance name is performed for disk drivers having a status of valid, and disk drivers having a status of invalid do not undergo processing. Consequently, program execution time can be reduced, and programs can be executed faster and more efficiently.

In some embodiments, referring back to FIG. 2A, process 200 of FIG. 2A further includes: in 260, before each disk driver determines the mapping relationship with the corresponding disk adapter based on an instance name, the computer terminal acquires the instance name of the disk adapter.

Figure 2E:
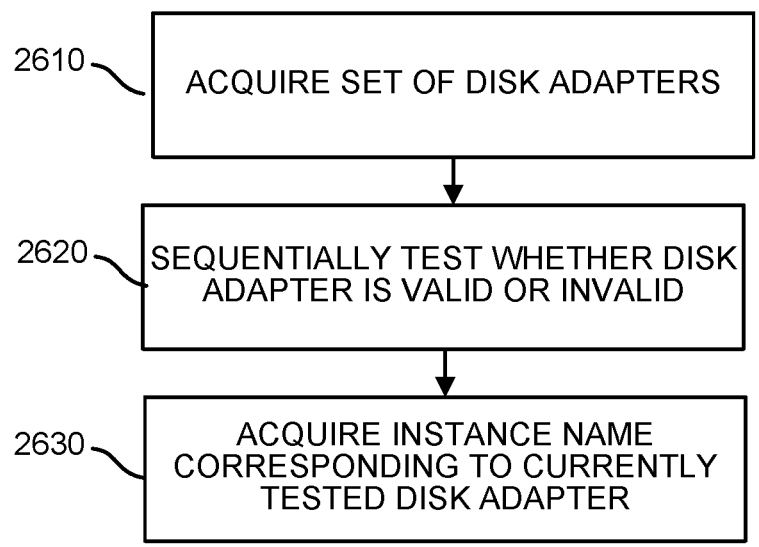
FIG. 2E is a flowchart of an embodiment of a process for acquiring an instance name of a disk adapter.

FIG. 2E is a flowchart of an embodiment of a process for acquiring an instance name of a disk adapter. In some embodiments, the process 2600 is an implementation of operation 260 of FIG. 2A and comprises:

In 2610, the computer terminal acquires a set of all disk adapters in a virtual machine.

In 2620, the computer terminal sequentially tests whether each disk adapter is valid or invalid until testing of all disk adapters is completed.

In 2630, in the event that any currently tested disk has a valid status, the computer terminal acquires an instance name corresponding to the currently tested disk adapter.

In some embodiments, similar to disk drivers, when the disk adapter can be used, that means the disk adapter is valid; and when the disk adapter cannot be used, that means the disk adapter is invalid. Therefore, to test the validity of a disk adapter is to test whether the disk adapter can be used. Therefore, to acquire the instance name corresponding to a disk adapter, the status of the disk adapter can be first acquired and tested to determine whether the disk adapter is valid or invalid; and when the disk adapter is valid, the instance name of the currently tested disk adapter is acquired. If the disk adapter is invalid, process 2600 is repeated, and the next disk adapter undergoes similar processing.

In some embodiments, the instance name acquisition process 2600 is performed on disk adapters having a status of valid, and disk adapters having a status of invalid do not undergo processing. Consequently, program execution time can be conserved, and programs can be executed faster and more efficiently.

In some embodiments, referring back to FIG. 2A, in operation 220 of FIG. 2A, the user terminal matches the disk location information corresponding to logical partitions against location information for at least one virtual disk already stored on a physical machine or network equipment.

Figure 2F:
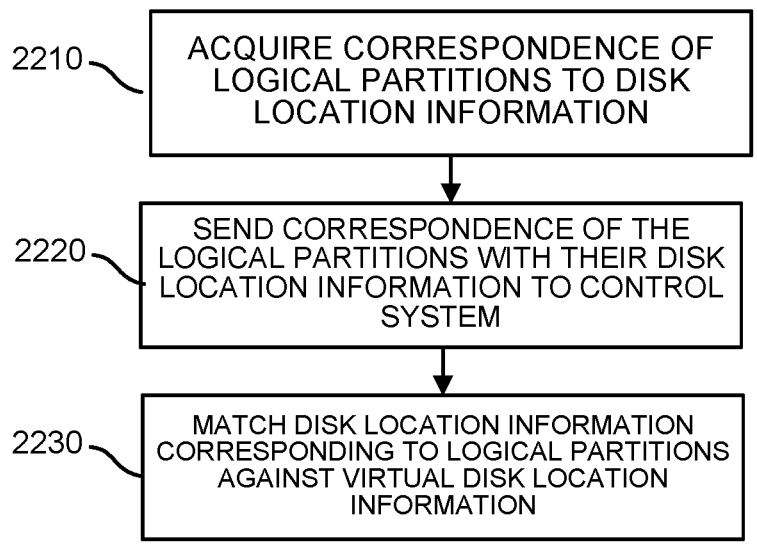
FIG. 2F is a flowchart of an embodiment of a process for matching a disk location information corresponding to a logical partition against location information for at least one virtual disk.

FIG. 2F is a flowchart of an embodiment of a process for matching a disk location information corresponding to a logical partition against location information for at least one virtual disk. The process 2200 is an implementation of operation 220 of FIG. 2A and comprises:

In 2210, the computer terminal acquires correspondence of logical partitions to disk location information based on disk location information for virtual machine logical partitions within virtual machines.

In 2220, the computer terminal sends the correspondence of the logical partitions with their disk location information to a control system in a physical machine or network equipment.

In 2230, the control system matches the disk location information corresponding to the logical partitions against the virtual disk location information for at least one stored Quick Emulator (QEMU) virtual disk. In some embodiments, the computer terminal determines the subordination relationship of the logical partitions with the QEMU virtual disk in the physical machine or network equipment based on the matching results.

Using the Windows operating system as an example, relationships between logical partitions, disk drivers, and disk adapters have definite mapping relationships. The resource manager that oversees virtual machines can discover that logical partitions can be subordinate to one or more virtual disks, and, as an aspect, that the disk driving implemented by Windows does not make use of just one layer. As an example, the disk driving completes the operations using a layered design, which contains the necessary disk driver layer and disk adapter layer. These two layers have a vertical, one-to-one correspondence.

Figure 4:
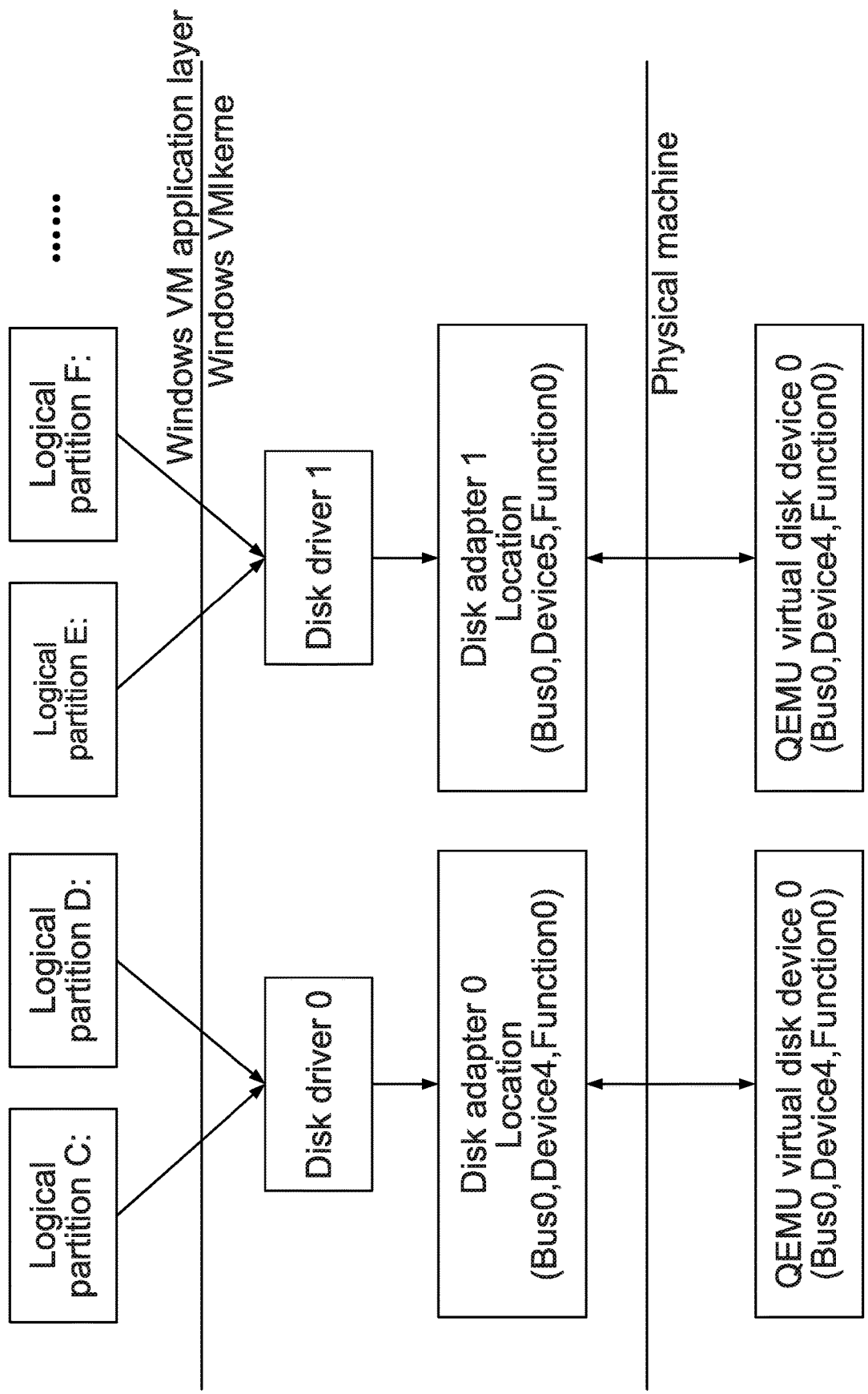
FIG. 4 is a relational diagram of an embodiment of a Windows logical partition, disk driver, and disk adapter.

FIG. 4 is a relational diagram of an embodiment of a Windows logical partition, disk driver, and disk adapter. As shown in FIG. 4, logical partitions C: and D: are both driven by disk driver 0. Moreover, logical partitions C: and D: have the same corresponding disk location information in a virtual machine (not shown). For example, the disk location information of logical partitions C: and D: is Location (Bus0, Device4, Function0). Logical partitions E: and F: are both driven by disk driver 1. Moreover, the logical partitions E: and F: have the same corresponding disk location information in the virtual machine. For example, the disk location information of logical partitions E: and F: is Location (Bus0, Device5, Function0). For an operating system (such as Windows), virtual devices (such as virtual disks) and true devices (such as physical machines) can be the same. As long as a true device is a PCI device, the true device is to generate one piece of corresponding location information when the true device is mounted onto the computer. This location information can be accessed in either a physical machine or a virtual machine, and the correspondence is one-to-one. Therefore, a logical partition having the disk location information Location (Bus0, Device5, Function0) has a subordination relationship with a virtual disk having the physical machine location information Location (Bus0, Device5, Function0). By the same token, a logical partition having the disk location information Location (Bus0, Device4, Function0) has a subordination relationship with a virtual disk having the physical machine location information Location (Bus0, Device4, Function0).

TABLE 1

| Disk Identifier/<br>Logical Partition | Disk Driver | Disk Adapter |
| --- | --- | --- |
| C: | 0 | 0 |
| D: | 0 | 0 |
| E: | 1 | 1 |
| F: | 1 | 1 |
| G: | 2 | 2 |
| H: | 2 | 2 |

As discussed above, to identify and display, in a physical machine control system, the mapping relationship (subordination relationship) of a logical partition in a virtual machine with a particular virtual disk, includes to: locate the virtual disk corresponding to the logical partition in the virtual machine and then acquire disk location information of the virtual disk and determine the correspondence between the logical partition and the disk location information of the logical partition; send this correspondence to the physical machine control system; and lastly, match the disk location information corresponding to the logical partition in the virtual machine with the location information for the QEMU virtual disk in the physical machine, and find the subordination relationship of the logical partition in the Windows VM with the virtual disk in the physical machine control system based on the matching result.

The mapping relationships between logical partitions, disk drivers, and disk adapters are introduced using the Windows operating system as an example. During actual implementation, the resource manager that oversees virtual machines can discover that logical partitions may be subordinate to one or more disks, but that the disk driving implemented by Windows does not make use of just one layer. As an aspect, the resource manager can make use of a layered design, which includes the disk driver layer and disk adapter layer. The two layers can have a vertical, one-to-one correspondence.

Please note that the disk device (i.e., the virtual disk) simulated in the virtual machine can be a PCI-type device (i.e., PCI device). For an operating system, a true device and a virtual device can be the same. As long as the true device is a PCI-type device, the true device is to have one piece of corresponding location information when the true device is mounted onto a computer. The location information can be accessed in both the physical machine and the virtual machine, and the correspondence is one-to-one.

Identifying and displaying in a physical machine control system the mapping relationship of a logical partition in a virtual machine with a particular virtual disk includes: finding the virtual disk corresponding to the logical partition in the virtual machine, and then acquiring disk location information of the virtual disk and the correspondence between the logical partition and disk location information of the logical partition; sending this correspondence to the physical machine control system; and lastly, comparing the disk location information in the virtual machine with the location information for the QEMU virtual disk in the physical machine, and finding the subordination relationship (mapping relationship) of the logical partition in the Windows VM with the virtual disk in the physical machine control system.

Furthermore, finding the correspondence between a disk identifier (i.e., a logical partition) and the disk location information in the virtual machine is one of the operations of the process. Logical partitions, disk drivers, and disk adapters have shared and unique attributes, as shown in FIG. 3. Therefore, finding the disk driver to which a given logical partition is subordinate based on the "disk number" attribute is possible. Then, the shared attribute (i.e., joint attribute) "disk driver instance name" of the disk driver and the disk adapter can be used to find the shared attribute's corresponding disk adapter and disk location information. Finally, the disk identifier is mapped to the disk location information.

In embodiments discussed below, Windows application program interfaces (APIs) such as SetupDiGetClassDevs, SetupDiEnumDeviceInfo, and SetupDiGetDeviceProperty can be used in the acquiring of the "disk driver instance name" attribute. Windows APIs such as GetLogicalDrives, CreateFile, and DeviceIoControl can be used in the acquiring of the "disk number" attributes corresponding to all the logical partitions. The processes whereby "disk number" and "disk driver instance name" are acquired are shown in FIG. 5 and in FIGS. 6 and 7, respectively.

Figure 5:
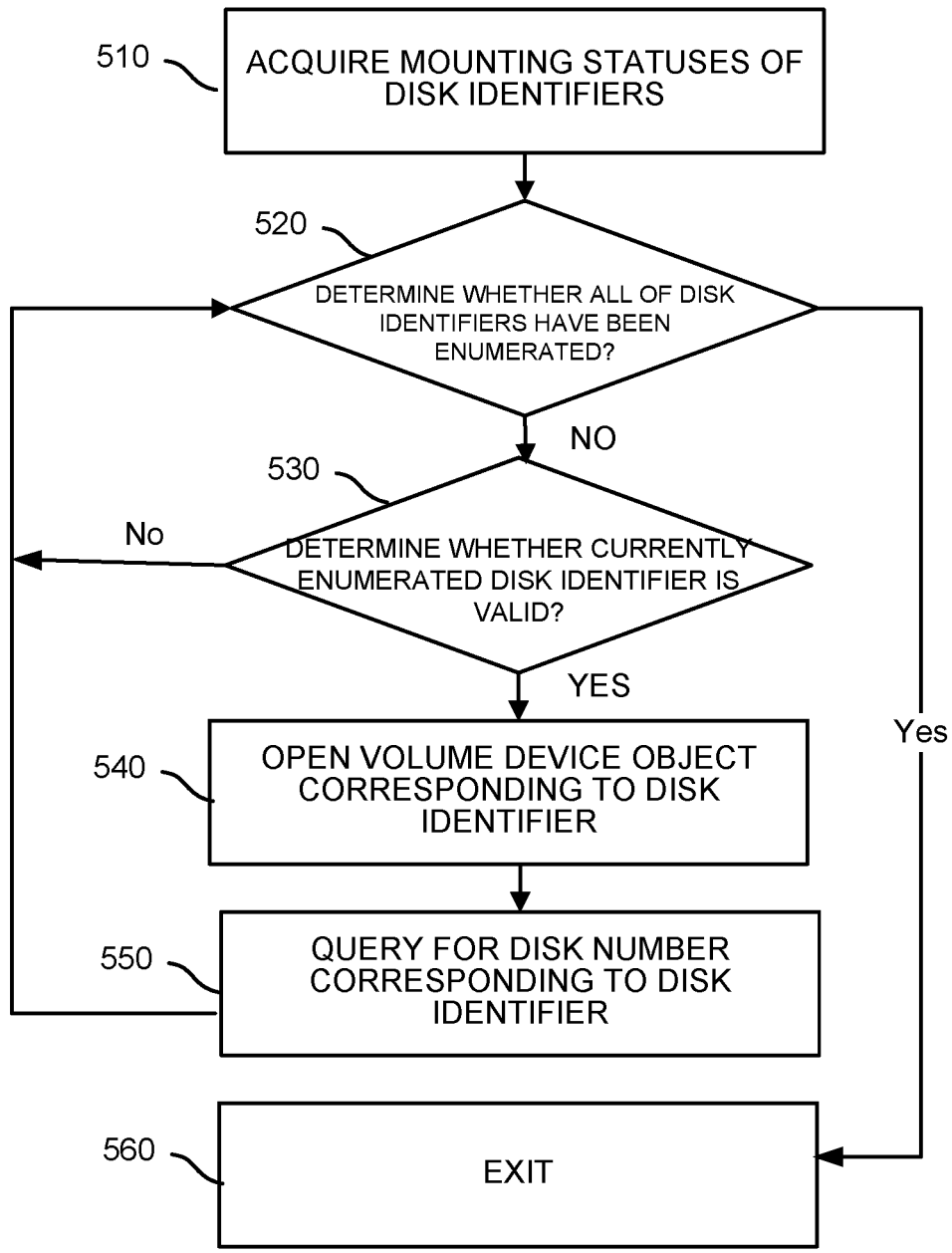
FIG. 5 is a flowchart of an embodiment of a process for acquiring disk numbers corresponding to logical partitions.

FIG. 5 is a flowchart of an embodiment of a process for acquiring disk numbers corresponding to logical partitions. In some embodiments, the process 500 is performed by the computer terminal 100 of FIG. 1 and comprises:

In 510, the computer terminal acquires mounting statuses of disk identifiers in a virtual machine and sequentially enumerates and checks the disk identifiers. For example, the computer terminal acquires the mounting statuses of the disk identifiers in the virtual machine based on the Windows API GetLogical Drives and sequentially enumerates and checks the disk identifiers.

In 520, the computer terminal determines whether all of the disk identifiers have been enumerated. In the event that all of the disk identifiers have been enumerated, then control passes to operation 560. In the event that all of the disk identifiers have not been enumerated, then control passes to operation 530.

In operation 530, the computer terminal determines whether a currently enumerated disk identifier is valid. In the event that the currently enumerated disk identifier is valid, then control passes to operation 540. In the event that the currently enumerated disk identifier is not valid, then control passes to operation 520.

In 540, the computer terminal opens a volume device object corresponding to the disk identifier. For example, the computer terminal opens the volume device object corresponding to the disk identifier based on Windows API CreateFile("\\.\N:" . . . ).

In 550, the computer terminal queries for a disk number corresponding to the disk identifier. For example, the computer terminal calls DeviceIoControl to query for the disk number corresponding to the disk identifier based on the IOCTL_STORAGE_GET_DEVICE_NUMBER function number, and control passes back to operation 520.

In 560, the computer terminal exits the process.

Figure 6:
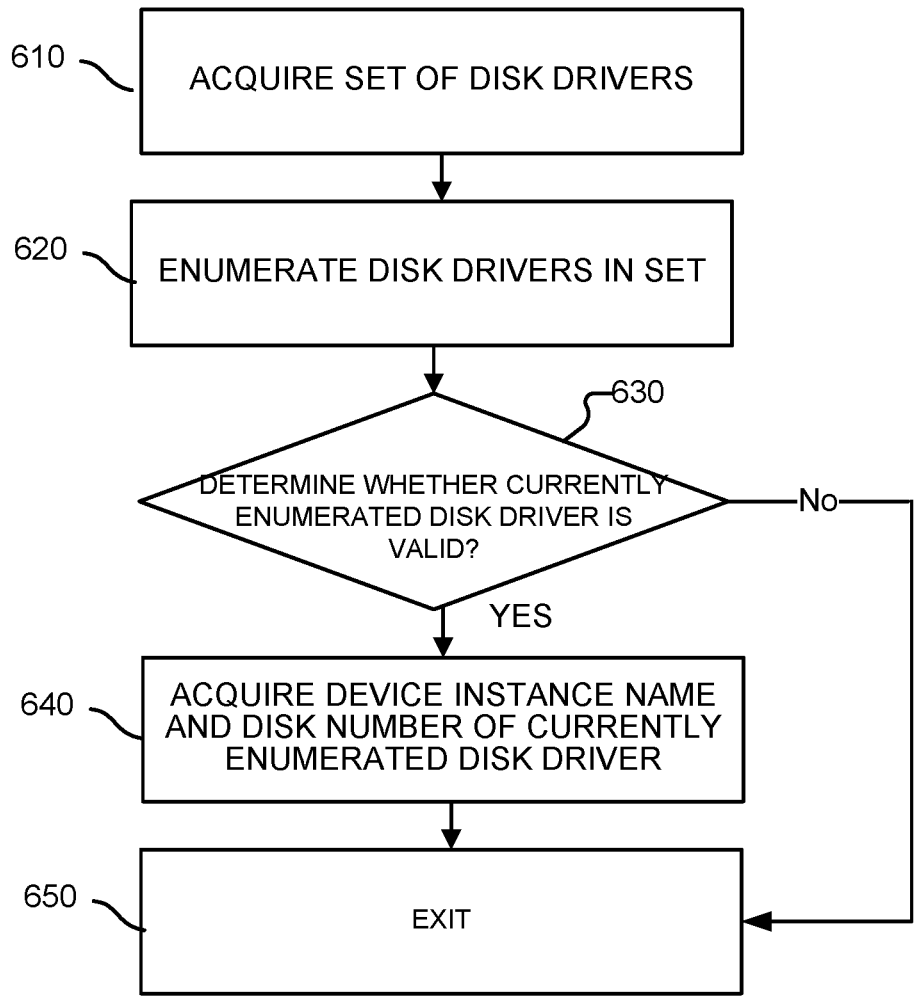
FIG. 6 is a flowchart of an embodiment of a process for acquiring instance names from disk drivers.

FIG. 6 is a flowchart of an embodiment of a process for acquiring instance names from disk drivers. In some embodiments, the process 600 is performed by the computer terminal 100 of FIG. 1 and comprises:

In 610, the computer terminal acquires a set of disk drivers in a system. For example, the computer terminal calls SetupDiGetClassDev(GUID_DEVCLASS_DISK-DRIVE, . . . ) to acquire the set of the disk drivers in the system.

In 620, the computer terminal enumerates the disk drivers in the set. For example, the computer terminal enumerates the disk drivers in the set based on SetupDiEnumDeviceInfo.

In 630, the computer terminal determines whether the currently enumerated disk driver is valid. In the event that the currently enumerated disk driver is valid, control passes to 640. In the event that the currently enumerated disk driver is not valid, control passes to 650.

In 640, the computer terminal acquires a device instance name and a disk number of the currently enumerated disk driver, and stores the device instance name and the disk number. For example, the computer terminal acquires the device instance name and the disk number based on SetupDiGetDeviceProperty, and stores the device instance name and the disk number.

In 650, the computer terminal exits the process.

Figure 7:
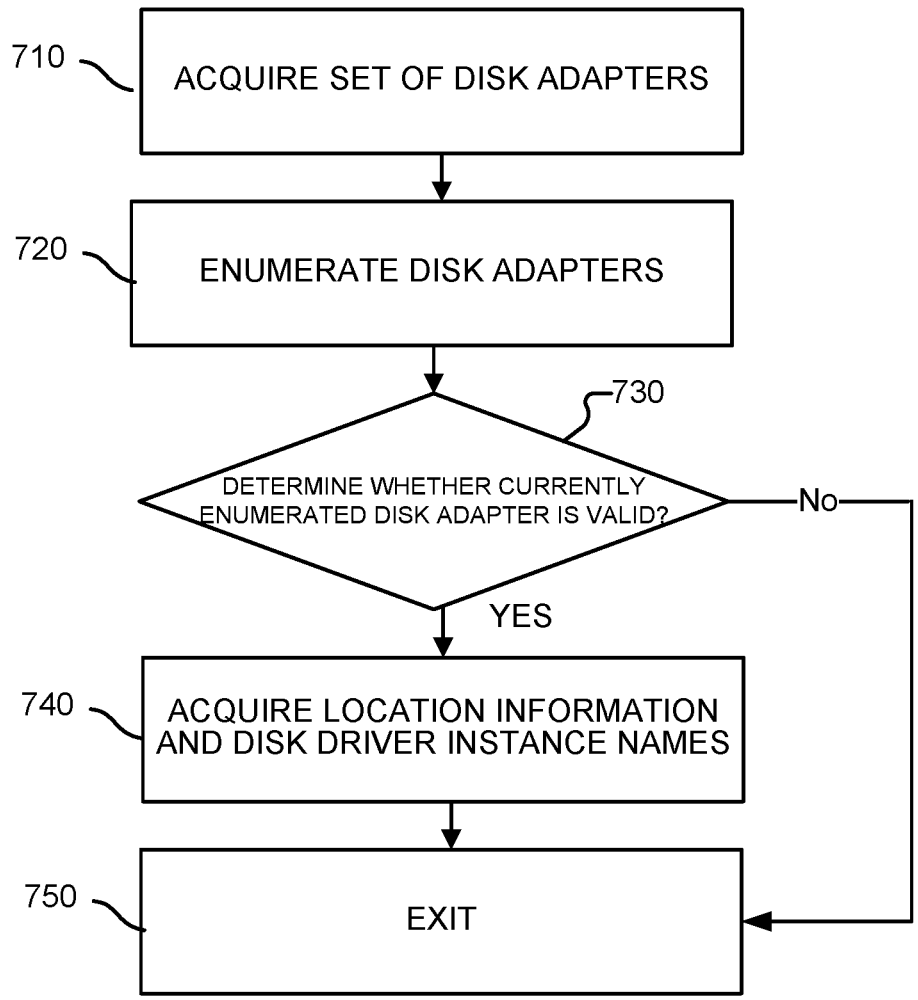
FIG. 7 is a flowchart of an embodiment of a process for acquiring instance names from disk adapters.

FIG. 7 is a flowchart of an embodiment of a process for acquiring instance names from disk adapters. In some embodiments, the process 700 is performed by the computer terminal 100 of FIG. 1 and comprises:

In 710, the computer terminal acquires a set of disk adapters in a system. For example, the computer terminal calls SetupDiGetClassDev(GUID_DEVCLASS_SCSI-ADAPTER, . . . ) to acquire the set of the disk adapters in the system.

In 720, the computer terminal enumerates the disk adapters in the set. For example, the computer terminal enumerates Small Computer System Interface (SCSI) disk adapters in the set based on SetupDiEnumDeviceInfo.

In 730, the computer terminal determines whether a currently enumerated disk adapter is valid. In the event that the currently enumerated disk adapter is valid, control is passed to 740. In the event that the currently enumerated disk adapter is not valid, control is passed to 750.

In 740, the computer terminal acquires location information and disk driver instance names and stores the location information and the disk driver instance names. For example, the computer terminal acquires location information and sub-device instance names based on SetupDiGetDeviceProperty and stores the location information and the sub-device instance names.

In 750, the computer terminal exits the process.

In some embodiments, mapping relationships between Windows operating system logical partitions, disk drivers, and disk adapters, and mapping relationships between disk location information in disk adapters and QEMU virtual disk location information in physical machines are used to map relationships of logical partitions to the virtual disks because it is difficult to identify, or easy to confuse, the subordination relationships of logical partitions in Windows virtual machines with virtual disks in physical machine control systems and identify the mapping relationships of logical partitions with virtual disks and prevent the confusion of logical partitions with virtual disks. Thus, the determination of the mapping relationships reduces and even eliminates the hidden risks in data disaster recovery.

Figure 8:
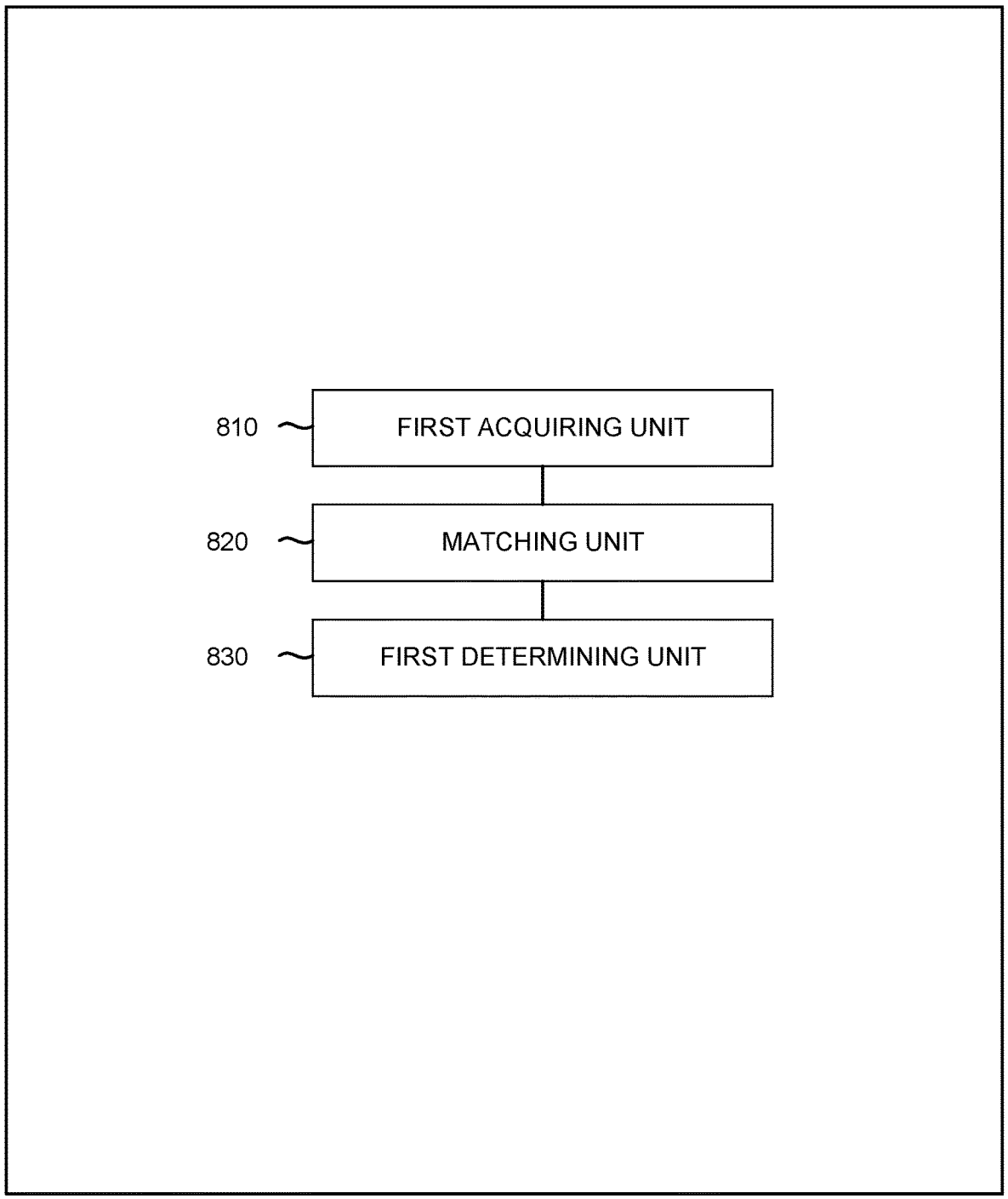
FIG. 8 is a diagram of an embodiment of a device for acquiring location information for logical partitions in virtual machines.

FIG. 8 is a diagram of an embodiment of a device for acquiring location information for logical partitions in virtual machines. In some embodiments, the device 800 is configured to implement the process 200 of FIG. 2A and comprises: a first acquiring unit 810, a matching unit 820, and a first determining unit 830.

In some embodiments, the first acquiring unit 810 is configured to acquire disk location information for virtual machine logical partitions within virtual machines. In some embodiments, the disk location information corresponds to location information for virtual disks corresponding to logical partitions in virtual machines.

In some embodiments, the matching unit 820 is configured to match the disk location information corresponding to the logical partitions against location information for at least one virtual disk stored on a physical machine or network equipment. In some embodiments, the virtual disk location information corresponds to a storage path generated after the virtual machine is installed on the physical machine or the network equipment.

In some embodiments, the first determining unit 830 is configured to, when the matching is successful, determine the virtual disk information to be the location information for the virtual machine logical partitions in the physical machine or network equipment.

In other words, the disk location information can be the location information for the virtual disks to which the logical partitions are subordinate within the virtual machines. The virtual machines can correspond to virtual devices generated on the physical machines or the network equipment, and the virtual machines can be created based on hypervisor programs such as VMware, KVM, Hyper-V and Xen. In some embodiments, a virtual machine typically has several virtual disks. The virtual disks can be formed by a local physical machine, or the virtual disks can be formed by cloud storage devices. Also, the virtual disks can be formed by a snapshot.

Using a virtual machine installed on a local physical machine as an example, the current disk information for the physical disks of the local physical machine in the virtual machine's disk manager can be viewed. In this way, after the virtual disks of the virtual machine are partitioned into at least one logical partition, the physical disk corresponding to the virtual disk where any logical partition is located can be determined.

Please note that, for an operating system (such as Windows), virtual devices and actual devices are the same. As long as the virtual device is a PCI device, the virtual device is to generate one piece of corresponding location information when the virtual device is mounted onto the computer.

The location information can be accessed on either a physical machine or a virtual machine, and the correspondence between the virtual device and the corresponding location information is one-to-one.

Since the virtual disks simulated by a virtual machine are also PCI devices, a virtual machine can access the above-described disk location information for a logical partition. Moreover, a physical machine or network equipment can access at least one piece of already stored virtual disk location information. If the disk location information that is accessed in a virtual machine for a logical partition has a one-to-one correspondence with the virtual disk location information for a certain virtual disk, this one-to-one correspondence means that the logical partition has a subordination relationship (mapping relationship) with the virtual disk.

As an example, to determine the subordination relationship of a designated logical partition within a virtual machine with a corresponding virtual disk in a physical machine or network equipment, disk location information corresponding to the logical partition can be matched against location information for at least one virtual disk stored on a physical machine or network equipment.

The virtual disk corresponding to the virtual disk location information obtained through matching is the virtual disk to which the logical partition is subordinate. In addition, when the matching is not successful, the virtual disk information currently obtained by matching is determined not to correspond to the location information for the virtual machine logical partition in the physical machine or the network equipment. Moreover, the virtual disk corresponding to the virtual disk location information currently obtained by matching is not a virtual disk subordinate to the logical partition.

Accordingly, when a virtual machine has several virtual disks of the same size, a situation can occur where it is difficult to identify, or easy to confuse, mapping relationships of logical partitions in virtual machines with virtual disks in a physical machine or network equipment. To reduce the difficulty of identifying the mapping relationships, disk location information for virtual machine logical partitions within the virtual machines and stored location information for at least one virtual disk in a physical machine or network equipment can be acquired, and then the acquired disk location information can be matched against the virtual disk location information. Then, if the match is successful, the matched virtual disk location information is determined to be the location information for the virtual machine logical partition in the physical machine or network equipment, and thus the mapping relationship between the designated logical partition and the corresponding virtual disk is found. Virtual disks correspond to PCI devices, and each PCI device generates one piece of corresponding location information when mounted onto a computer. Moreover, the location information can be accessed in either a physical machine or in a virtual machine, and the correspondence between the disk location information and the virtual disk is one-to-one. Therefore, the disk location information for virtual machine logical partitions within the virtual machines and stored location information for at least one virtual disk in a physical machine or network equipment can be first acquired and then the acquired disk location information can be matched against the virtual disk location information. In this way, the one-to-one correspondence of the results of accessed location information generated when the virtual disk was mounted on the virtual machine in the virtual machine versus the physical machine can be used to, when two pieces of location information are successfully matched, determine that the matched virtual disk location information is the location information of the virtual machine logical partition in the physical machine or the network equipment. Not only can this determination lower the difficulty of identifying the mapping relationship of the designated logical partition with its corresponding virtual disk, but also the determination avoids confusing logical partitions with their corresponding virtual disks. Therefore, the determination can reduce or even eliminate the hidden risks involved in data disaster recovery.

Figure 9A:
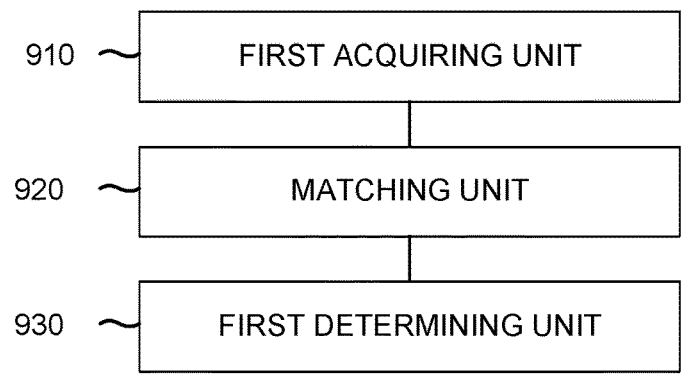
FIG. 9A is a diagram of another embodiment of a device for acquiring location information for logical partitions in virtual machines.

FIG. 9A is a diagram of another embodiment of a device for acquiring location information for logical partitions in virtual machines. In some embodiments, the device 900 is configured to implement the process 200 of FIG. 2A and comprises: a first acquiring unit 910, a matching unit 920, and a first determining unit 930.

Figure 9B:
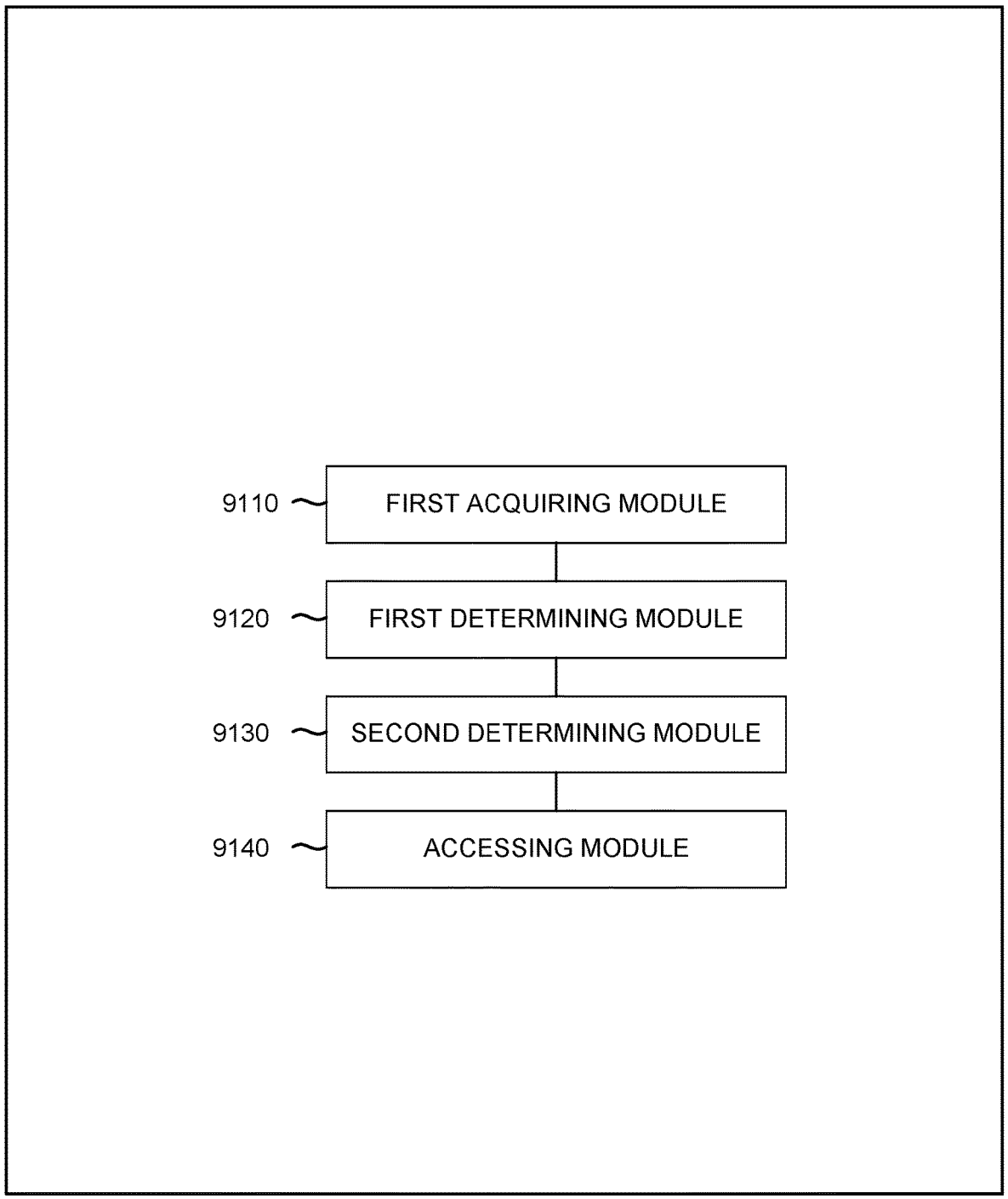
FIG. 9B is a diagram of an embodiment of an acquiring unit.

FIG. 9B is a diagram of an embodiment of an acquiring unit. In some embodiments, the acquiring unit 9100 is an implementation of the first acquiring unit 910 of FIG. 9A and comprises: a first acquiring module 9110, a first determining module 9120, a second determining module 9130, and an accessing module 9140.

In some embodiments, the first acquiring module 9110 is configured to acquire mapping relationships within virtual machines. The mapping relationships of each logical partition with the corresponding disk driver and the mapping relationships of each disk driver with the corresponding disk adapter are acquired.

In some embodiments, the first determining module 9120 is configured to determine, based on the mapping relationships, a disk driver having a mapping relationship with the logical partition, and a disk adapter having a mapping relationship with a disk driver.

In some embodiments, the second determining module 9130 is configured to determine the corresponding virtual disk for the logical partition in the virtual machine based on the disk adapter corresponding to the logical partition.

In some embodiments, the accessing module 9140 is configured to access the location information for the virtual disk corresponding to the logical partition and regard the location information as disk location information for the logical partition in the virtual machine.

In some embodiments, the matching unit 920 and the first determining unit 930 of FIG. 9A correspond with the matching unit 820 and the first determining unit 830 of FIG. 8, respectively.

In some embodiments, the acquiring unit 9100 is configured to implement process 2100 of FIG. 2B.

Figure 10A:
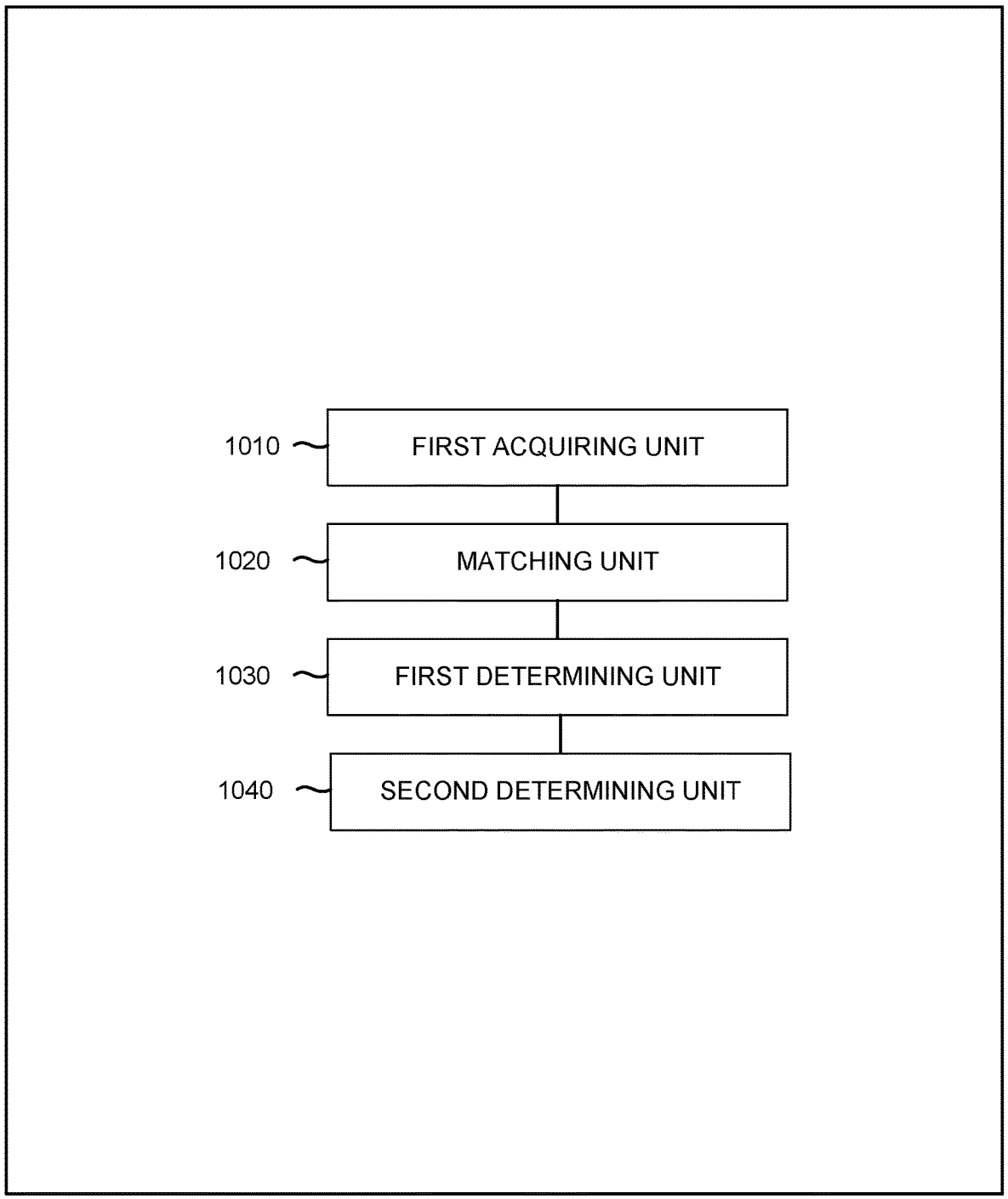
FIG. 10A is a diagram of yet another embodiment of a device for acquiring location information for logical partitions in virtual machines.

FIG. 10A is a diagram of yet another embodiment of a device for acquiring location information for logical partitions in virtual machines. In some embodiments, the device 1000 is configured to implement the process 200 of FIG. 2A and comprises: a first acquiring unit 1010, a matching unit 1020, a first determining unit 1030, and a second determining unit 1040.

In some embodiments, the matching unit 1020 and the first determining unit 1030 correspond with the matching unit 820 and the first determining unit 830 of FIG. 8, respectively.

Figure 10B:
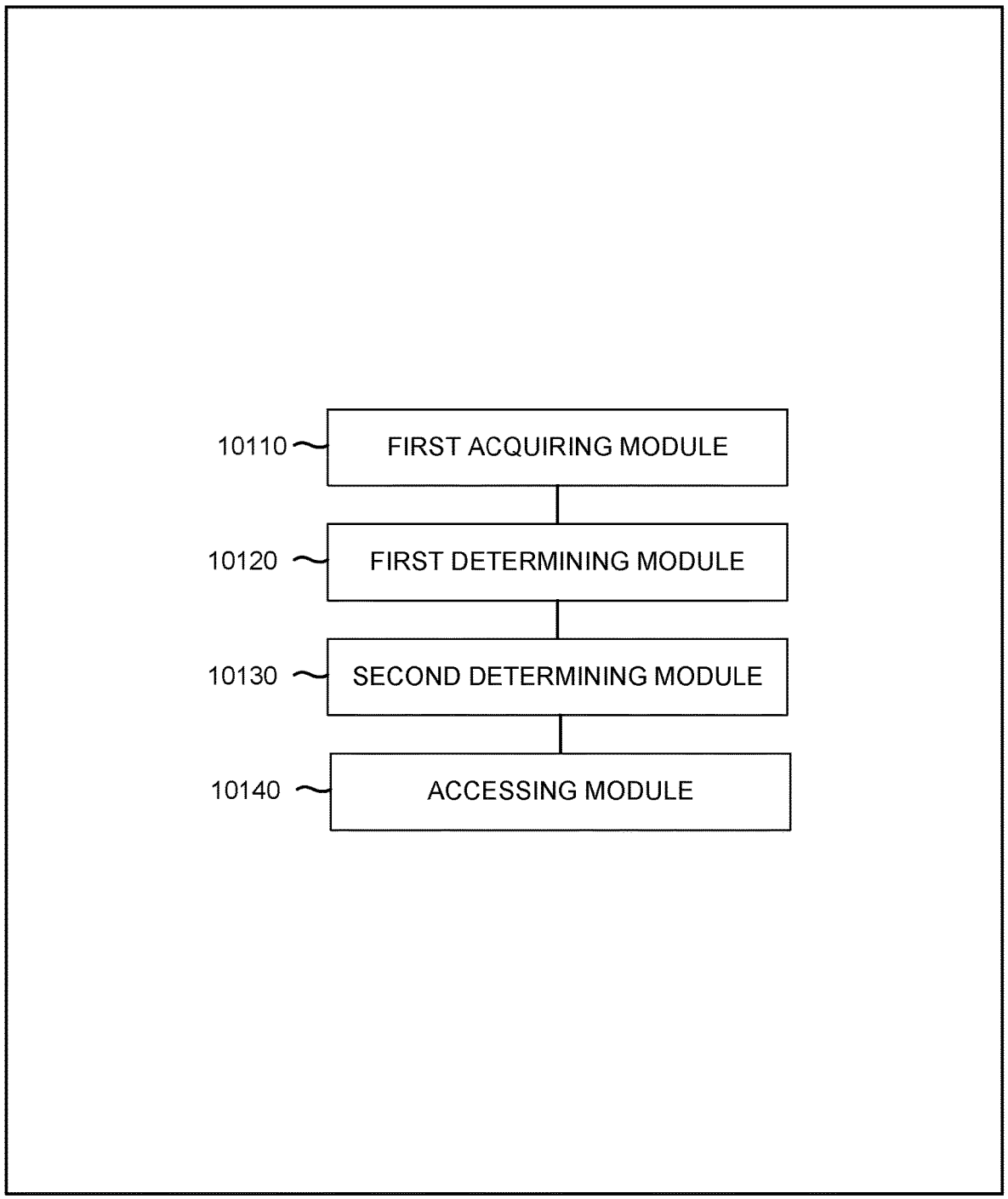
FIG. 10B is a diagram of another embodiment of an acquiring unit.

FIG. 10B is a diagram of another embodiment of an acquiring unit. In some embodiments, the acquiring unit 10100 is an implementation of the first acquiring unit 1010 of FIG. 10A and comprises: a first acquiring module 10110, a first determining module 10120, a second determining module 10130, and an accessing module 10140.

In some embodiments, the first acquiring module 10110 is configured to acquire mapping relationships within virtual machines.

In some embodiments, the first determining module 10120 is configured to determine, based on the mapping relationships, a disk driver having a mapping relationship with the logical partition, and a disk adapter having a mapping relationship with the disk driver.

In some embodiments, the second determining module 10130 is configured to determine, based on the disk adapter corresponding to the logical partition, the corresponding virtual disk of the logical partition in the virtual machine.

In some embodiments, the accessing module 10140 is configured to access the location information for the virtual disk corresponding to the logical partition and regard the location information as disk location information for the logical partition in the virtual machine.

In some embodiments, the logical partition comprises at least one of the following attributes: a logical partition disk identifier and a logical partition disk number. In some embodiments, the disk driver comprises at least one of the following attributes: a logical partition disk number and a disk driver instance name. In some embodiments, a disk adapter comprises at least the following attributes: a disk driver instance name and disk location information.

In some embodiments, the acquiring unit 10100 is configured to perform process 2100 of FIG. 2B.

In some embodiments, referring back to FIG. 10A, the second determining unit 1040 is configured to cause each logical partition to determine the mapping relationship with the corresponding disk driver based on the disk number and each disk driver to determine the mapping relationship with the corresponding disk adapter based on the instance name.

Figure 11A:
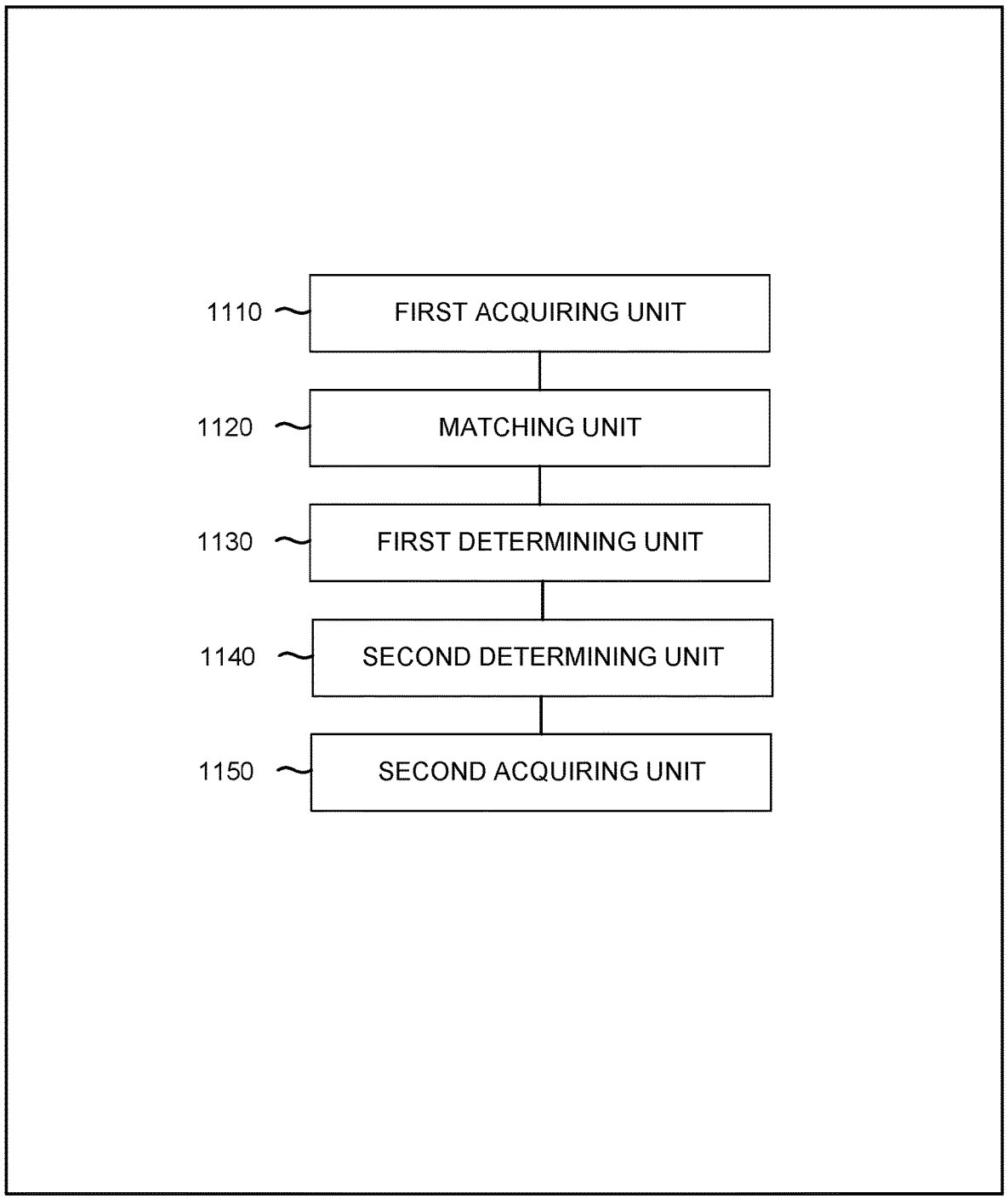
FIG. 11A is a diagram of yet another embodiment of a device for acquiring location information for logical partitions in virtual machines.

FIG. 11A is a diagram of yet another embodiment of a device for acquiring location information for logical partitions in virtual machines. In some embodiments, the device 1100 is configured to implement the process 200 of FIG. 2A and comprises: a first acquiring unit 1110, a matching unit 1120, a first determining unit 1130, a second determining unit 1140, and a second acquiring unit 1150.

The first acquiring unit 1110, the matching unit 1120, the first determining unit 1130, and the second determining unit 1140 correspond to the first acquiring unit 1010, the matching unit 1020, the first determining unit 1030, and the second determining unit 1040 of FIG. 10A.

In some embodiments, the device 1100 further comprises: a second acquiring unit 1150.

In some embodiments, the second acquiring unit 1150 is configured to, prior to each logical partition determining the mapping relationship with the corresponding disk driver based on the disk number, acquire a disk number corresponding to a logical partition.

Figure 11B:
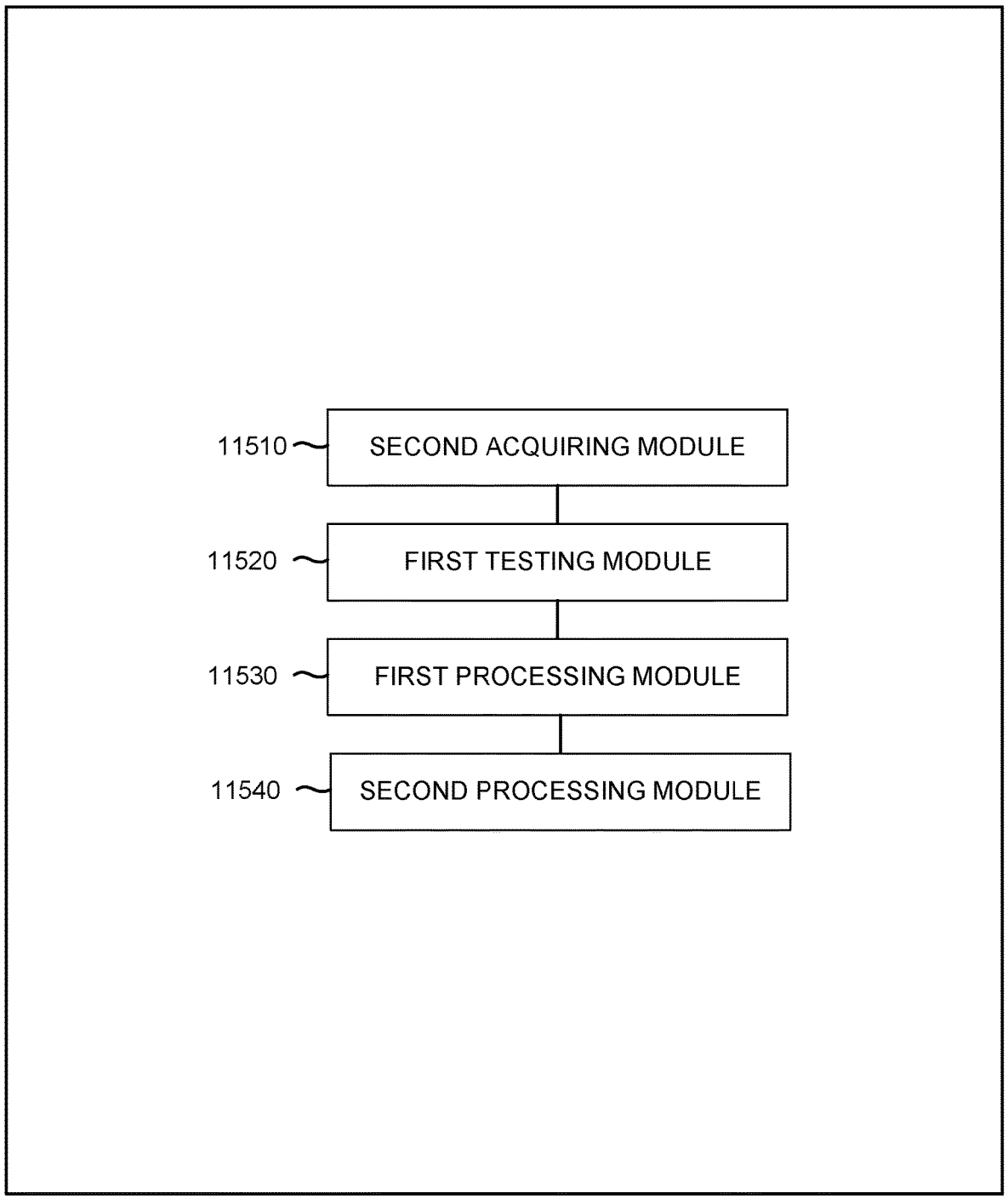
FIG. 11B is a diagram of another embodiment of an acquiring unit.

FIG. 11B is a diagram of another embodiment of an acquiring unit. In some embodiments, the acquiring unit 11500 is an implementation of the second acquiring unit 1150 of FIG. 11A and comprises: a second acquiring module 11510, a first testing module 11520, a first processing module 11530, and a second processing module 11540.

In some embodiments, the second acquiring module 11510 is configured to acquire mounting statuses of all logical partitions within the virtual machine.

In some embodiments, the first testing module 11520 is configured to sequentially test whether a mounting status of each logical partition is valid or invalid until the testing of all logical partitions is completed.

In some embodiments, the first processing module 11530 is configured to, in the event that a currently tested logical partition is valid, open a volume device object corresponding to the currently tested logical partition and query the volume device object to obtain a disk number corresponding to the currently tested logical partition.

In some embodiments, the second processing module 11540 is configured to, if any currently tested logical partition is invalid, trigger the first testing module 11520 to test whether the mounting status of a next logical partition is valid or invalid.

The acquiring unit 11500 is configured to perform process 500 of FIG. 5.

Figure 12A:
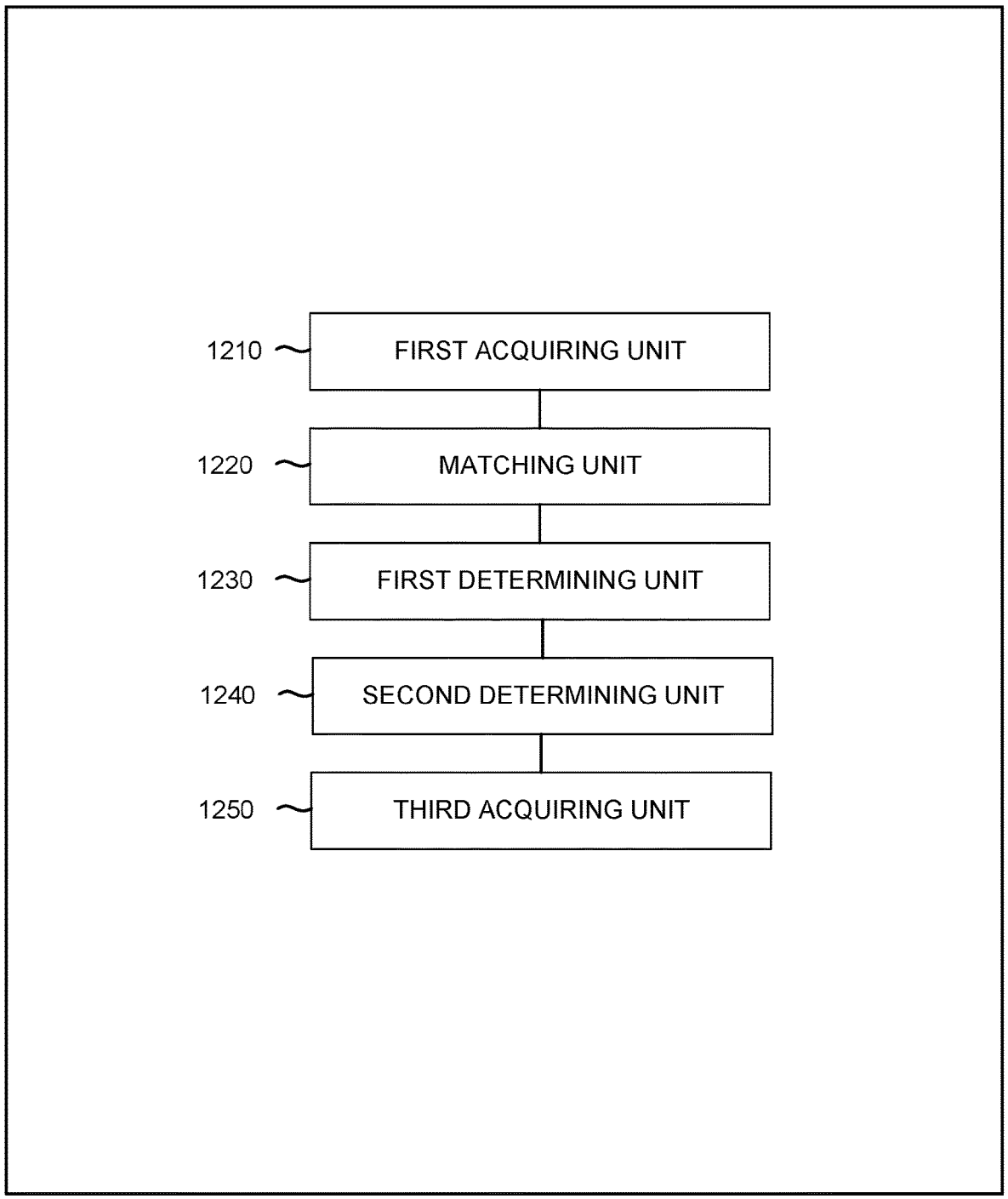
FIG. 12A is a diagram of yet another embodiment of a device for acquiring location information for logical partitions in virtual machines.

FIG. 12A is a diagram of yet another embodiment of a device for acquiring location information for logical partitions in virtual machines. In some embodiments, the device 1200 is configured to implement the process 200 of FIG. 2A and comprises: a first acquiring unit 1210, a matching unit 1220, a first determining unit 1230, a second determining unit 1240, and a third acquiring unit 1250.

The first acquiring unit 1210, the matching unit 1220, the first determining unit 1230, and the second determining unit 1240 correspond to the first acquiring unit 1010, the matching unit 1020, the first determining unit 1030, and the second determining unit 1040 of FIG. 10A.

In some embodiments, the third acquiring unit 1250 is configured to acquire an instance name of each disk driver before each disk driver determines the mapping relationship with the corresponding disk adapter based on the instance name.

Figure 12B:
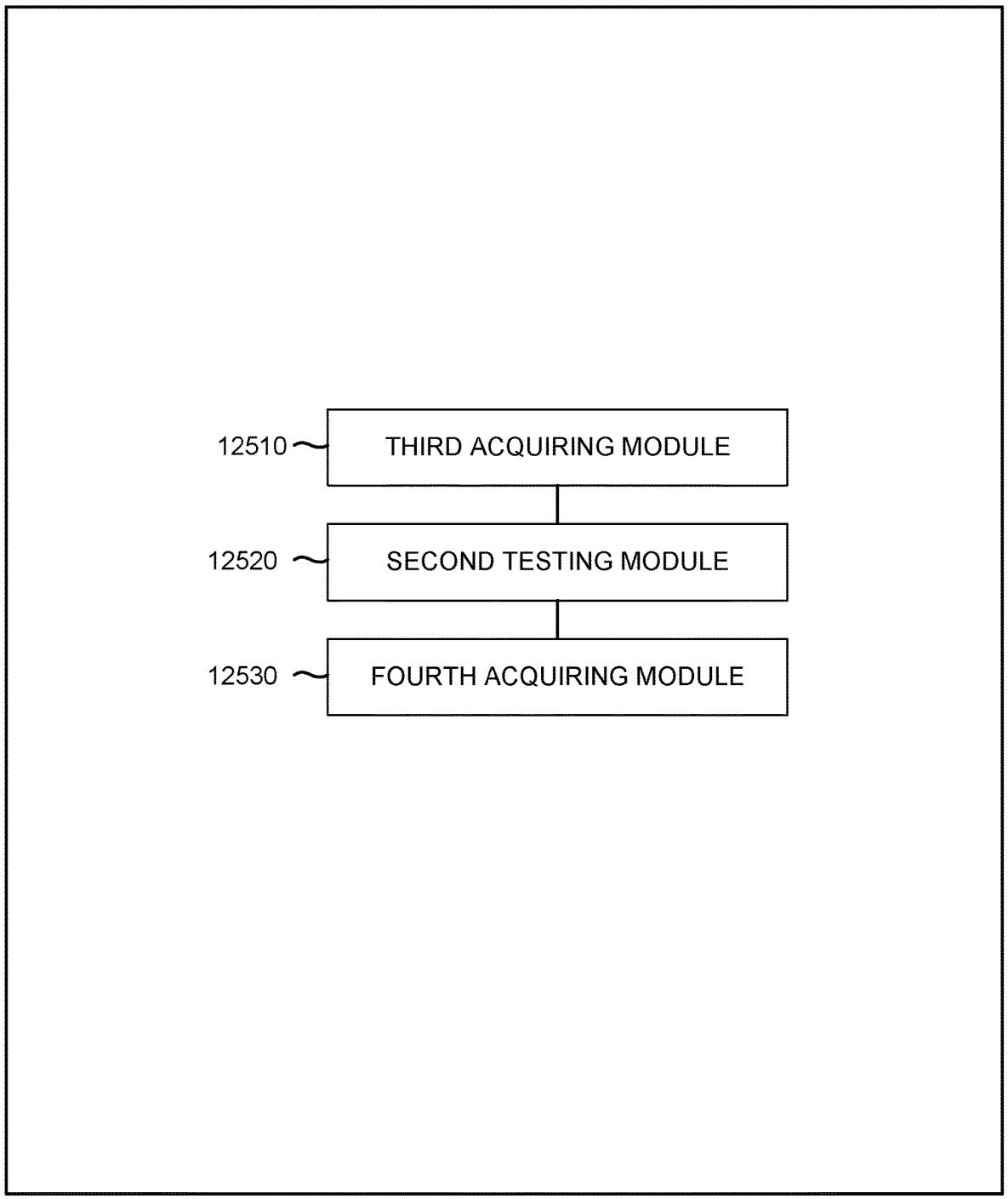
FIG. 12B is a diagram of another embodiment of an acquiring unit.

FIG. 12B is a diagram of another embodiment of an acquiring unit. In some embodiments, the acquiring unit 12500 is an implementation of the third acquiring unit 1250 of FIG. 12A and comprises: a third acquiring module 12510, a second testing module 12520, and a fourth acquiring module 12530.

In some embodiments, the third acquiring module 12510 is configured to acquire a set of all disk drivers in the virtual machine.

In some embodiments, the second testing module 12520 is configured to sequentially test whether each disk driver is valid or invalid until testing of all disk drivers is completed.

In some embodiments, the fourth acquiring module 12530 is configured to, if any currently tested disk driver is valid, acquire an instance name corresponding to the currently tested disk driver.

The acquiring unit 12500 is configured to perform process 600 of FIG. 6.

Figure 13A:
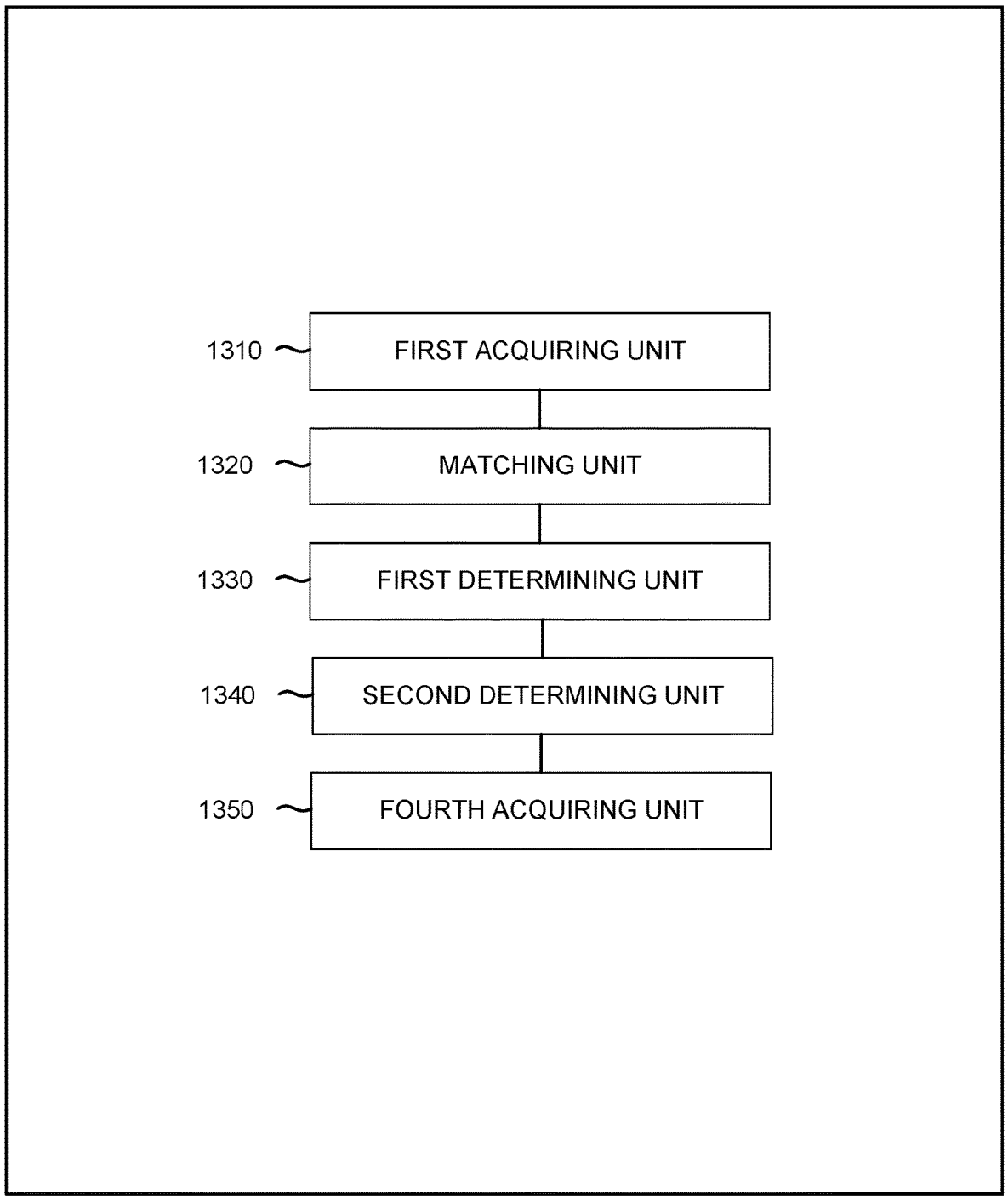
FIG. 13A is a diagram of yet another embodiment of a device for acquiring location information for logical partitions in virtual machines.

FIG. 13A is a diagram of yet another embodiment of a device for acquiring location information for logical partitions in virtual machines. In some embodiments, the device 1300 is configured to implement the process 200 of FIG. 2A and comprises: a first acquiring unit 1310, a matching unit 1320, a first determining unit 1330, a second determining unit 1340, and a fourth acquiring unit 1350.

The first acquiring unit 1310, the matching unit 1320, the first determining unit 1330, and the second determining unit 1340 correspond to the first acquiring unit 1010, the matching unit 1020, the first determining unit 1030, and the second determining unit 1040 of FIG. 10A.

In some embodiments, the fourth acquiring unit 1350 is configured to acquire the instance name of the disk adapter before each disk driver determines the mapping relationship with the corresponding disk adapter based on the instance name.

Figure 13B:
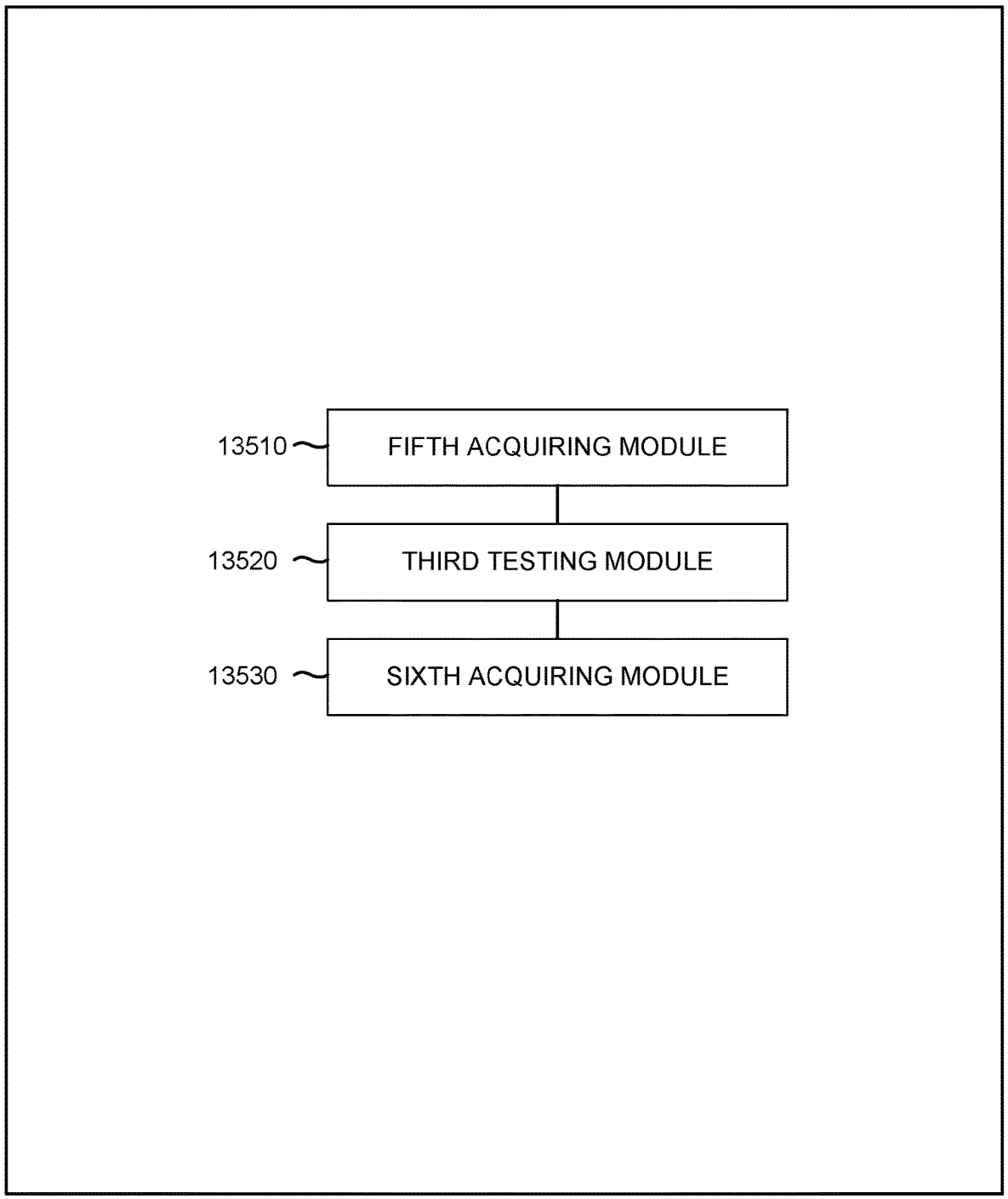
FIG. 13B is a diagram of another embodiment of an acquiring unit.

FIG. 13B is a diagram of another embodiment of an acquiring unit. In some embodiments, the acquiring unit 13500 is an implementation of the fourth acquiring unit 1350 of FIG. 13A and comprises: a fifth acquiring module 13510, a third testing module 13520, and a sixth acquiring module 13530.

In some embodiments, the fifth acquiring module 13510 is configured to acquire a set of all disk adapters in the virtual machine.

In some embodiments, the third testing module 13520 is configured to sequentially test whether each disk adapter is valid or invalid until testing of all disk drivers is completed.

In some embodiments, the sixth acquiring module 13530 is configured to, if any currently tested disk is valid, acquire an instance name corresponding to the currently tested disk adapter.

The acquiring unit 13500 is configured to perform process 700 of FIG. 7.

Figure 14A:
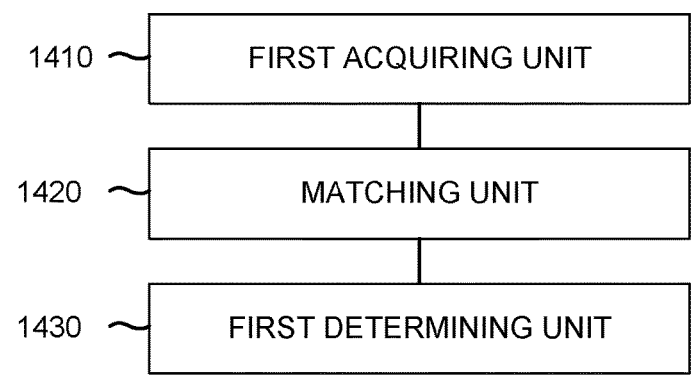
FIG. 14A is a diagram of yet another embodiment of a device for acquiring location information for logical partitions in virtual machines.

FIG. 14A is a diagram of yet another embodiment of a device for acquiring location information for logical partitions in virtual machines. In some embodiments, the device 1400 is configured to implement the process 200 of FIG. 2A and comprises: a first acquiring unit 1410, a matching unit 1420, and a first determining unit 1430.

The first acquiring unit 1410 and the first determining unit 1430 correspond to the first acquiring unit 1010 and the first determining unit 1030 of FIG. 10A.

Figure 14B:
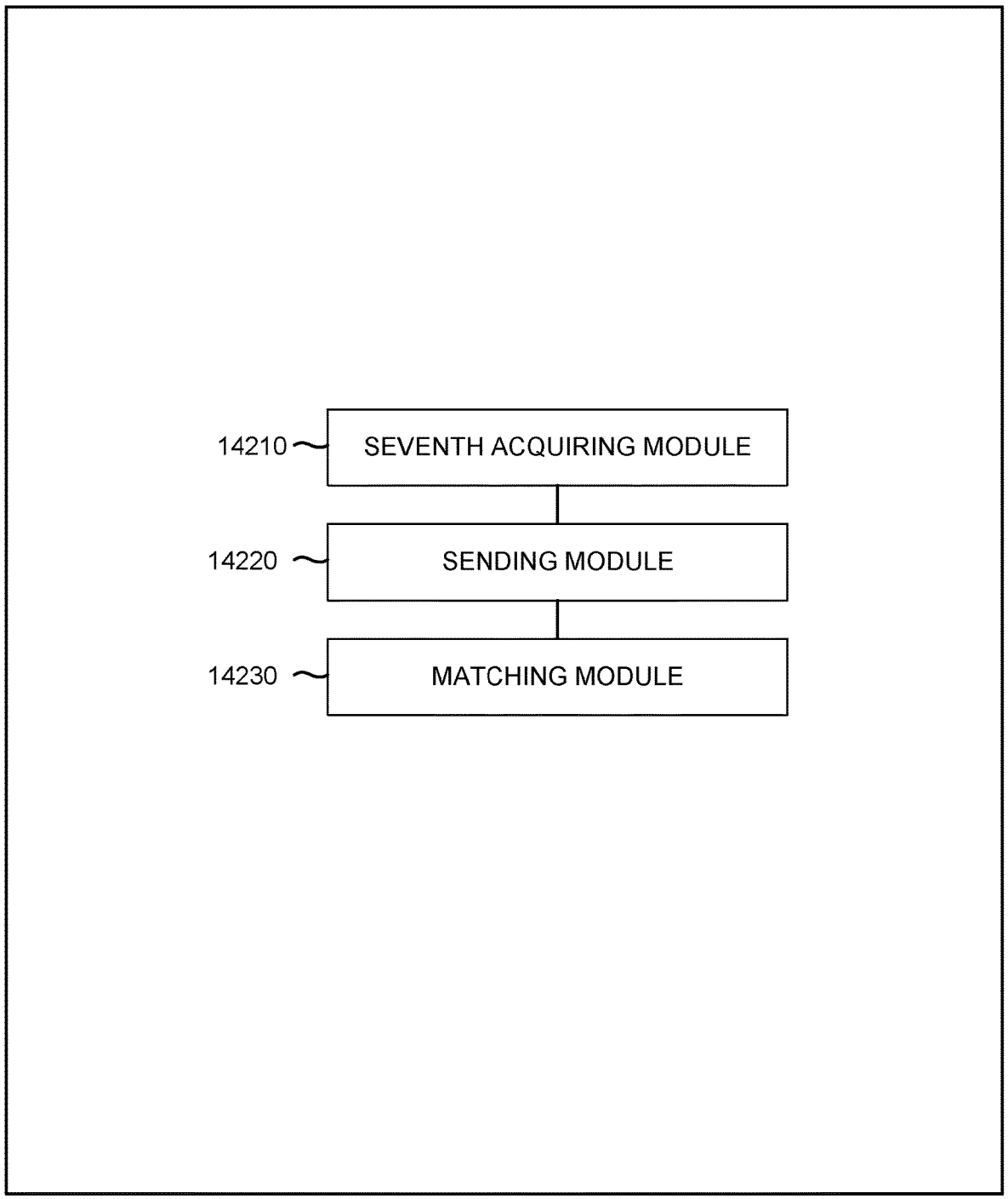
FIG. 14B is a diagram of an embodiment of a matching unit.

FIG. 14B is a diagram of an embodiment of a matching unit. In some embodiments, the matching unit 14200 is an implementation of the matching unit 1420 of FIG. 14A and comprises: a seventh acquiring module 14210, a sending module 14220, and a matching module 14230.

In some embodiments, the seventh acquiring module 14210 is configured to acquire correspondences of logical partitions with their disk location information based on disk location information for virtual machine logical partitions within virtual machines.

In some embodiments, the sending module 14220 is configured to send the correspondences of the logical partitions with their disk location information to the control system in the physical machine or the network equipment.

In some embodiments, the matching module 14230 is configured to match the disk location information corresponding to the logical partitions against the virtual disk location information for at least one stored QEMU virtual disk. In some embodiments, referring back to FIG. 14A, the first determining unit 1430 of FIG. 14A is further configured to determine the subordination relationship of the logical partitions with the QEMU virtual disk in the physical machine or network equipment based on the matching results.

The matching unit 1420 of FIG. 14A is configured to implement process 2200 of FIG. 2F.

The units and modules described above can be implemented as software components executing on one or more general purpose processors, as hardware such as programmable logic devices and/or Application Specific Integrated Circuits designed to perform certain functions, or a combination thereof. In some embodiments, the units and modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units and modules may be implemented on a single device or distributed across multiple devices. The functions of the units and modules may be merged into one another or further split into multiple sub-units and/or sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 15:
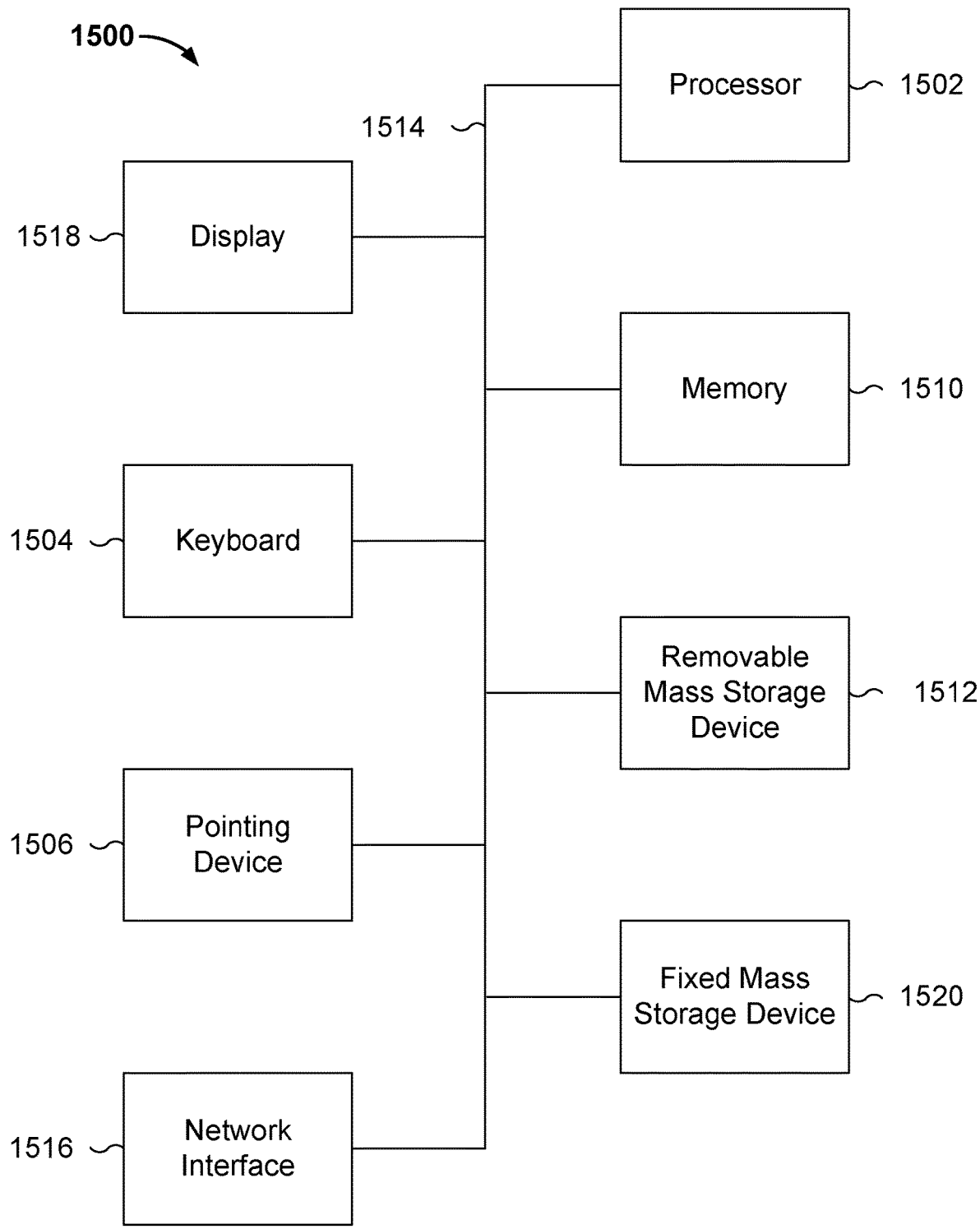
FIG. 15 is a functional diagram illustrating a programmed computer system for acquiring location information for logical partitions in virtual machines in accordance with some embodiments.

FIG. 15 is a functional diagram illustrating a programmed computer system for acquiring location information for logical partitions in virtual machines in accordance with some embodiments. As will be apparent, other computer system architectures and configurations can be used to acquire location information for logical partitions in virtual machines. Computer system 1500, which includes various subsystems as described below, includes at least one microprocessor subsystem (also referred to as a processor or a central processing unit (CPU)) 1502. For example, processor 1502 can be implemented by a single-chip processor or by multiple processors. In some embodiments, processor 1502 is a general purpose digital processor that controls the operation of the computer system 1500. Using instructions retrieved from memory 1510, the processor 1502 controls the reception and manipulation of input data, and the output and display of data on output devices (e.g., display 1518).

Processor 1502 is coupled bi-directionally with memory 1510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1502. Also as is well known in the art, primary storage typically includes basic operating instructions, program code, data, and objects used by the processor 1502 to perform its functions (e.g., programmed instructions). For example, memory 1510 can include any suitable computer-readable storage media, described below, depending on whether, for example, data access needs to be bi-directional or uni-directional. For example, processor 1502 can also directly and very rapidly retrieve and store frequently needed data in a cache memory (not shown).

A removable mass storage device 1512 provides additional data storage capacity for the computer system 1500, and is coupled either bi-directionally (read/write) or uni-directionally (read only) to processor 1502. For example, storage 1512 can also include computer-readable media such as magnetic tape, flash memory, PC-CARDS, portable mass storage devices, holographic storage devices, and other storage devices. A fixed mass storage 1520 can also, for example, provide additional data storage capacity. The most common example of mass storage 1520 is a hard disk drive. Mass storages 1512, 1520 generally store additional programming instructions, data, and the like that typically are not in active use by the processor 1502. It will be appreciated that the information retained within mass storages 1512 and 1520 can be incorporated, if needed, in standard fashion as part of memory 1510 (e.g., RAM) as virtual memory.

In addition to providing processor 1502 access to storage subsystems, bus 1514 can also be used to provide access to other subsystems and devices. As shown, these can include a display monitor 1518, a network interface 1516, a keyboard 1504, and a pointing device 1506, as well as an auxiliary input/output device interface, a sound card, speakers, and other subsystems as needed. For example, the pointing device 1506 can be a mouse, stylus, track ball, or tablet, and is useful for interacting with a graphical user interface.

The network interface 1516 allows processor 1502 to be coupled to another computer, computer network, or telecommunications network using a network connection as shown. For example, through the network interface 1516, the processor 1502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1502 can be used to connect the computer system 1500 to an external network and transfer data according to standard protocols. For example, various process embodiments disclosed herein can be executed on processor 1502, or can be performed across a network such as the Internet, intranet networks, or local area networks, in conjunction with a remote processor that shares a portion of the processing. Additional mass storage devices (not shown) can also be connected to processor 1502 through network interface 1516.

An auxiliary I/O device interface (not shown) can be used in conjunction with computer system 1500. The auxiliary I/O device interface can include general and customized interfaces that allow the processor 1502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 15 is but an example of a computer system suitable for use with the various embodiments disclosed herein. Other computer systems suitable for such use can include additional or fewer subsystems. In addition, bus 1514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
acquiring disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises:
acquiring mapping relationships pertaining to the virtual machine, the mapping relationships including first mapping relationships of a logical partition with a disk driver and second mapping relationships of the disk driver with a corresponding disk adapter, the disk driver being associated with a physical disk;
outputting the location information for at least one virtual disk to a physical device; and
acquiring disk numbers corresponding to the logical partitions, comprising:
opening a volume device object corresponding to the currently tested logical partition; and
querying the volume device object to obtain a disk number corresponding to the currently tested logical partition.

2. The method as described in claim 1, wherein the acquiring of the disk location information for the logical partitions within the virtual machine further comprises:
determining, based on the mapping relationships, a disk driver having a first mapping relationship with a logical partition, and a disk adapter having a second mapping relationship with the disk driver;
determining a corresponding virtual disk of the logical partition in the virtual machine based on the disk adapter corresponding to the logical partition; and
accessing location information for the virtual disk corresponding to the logical partition and providing the location information as disk location information for the logical partition in the virtual machine.

3. The method as described in claim 2, wherein:
the logical partition comprises: a logical partition disk identifier and a logical partition disk number;
the disk driver comprises: a logical partition disk number and a disk driver instance name;
the disk adapter comprises: a disk driver instance name and disk location information; and
the method further comprises:
determining a third mapping relationship with the disk driver based on a disk number for the logical partition; and
determining a fourth mapping relationship with the disk adapter based on an instance name for the disk driver.

4. A method, comprising:
acquiring disk location information for logical partitions, the logical partitions pertaining to a virtual machine, wherein the disk location information corresponds to location information for virtual disks corresponding to the logical partitions; and wherein the acquiring of the disk location information for the logical partitions within the virtual machine comprises:
acquiring mapping relationships pertaining to the virtual machine, the mapping relationships including first mapping relationships of a logical partition with a disk driver and second mapping relationships of the disk driver with a corresponding disk adapter, the disk driver being associated with a physical disk;
determining, based on the mapping relationships, the disk driver having a first mapping relationship with the logical partition, and a disk adapter having a second mapping relationship with the disk driver, wherein:
the logical partition comprises: a logical partition disk identifier and a logical partition disk number;
the disk driver comprises: a logical partition disk number and a disk driver instance name; and
the disk adapter comprises: a disk driver instance name and disk location information;
determining a corresponding virtual disk of the logical partition in the virtual machine based on the disk adapter corresponding to the logical partition; and
accessing location information for the virtual disk corresponding to the logical partition and providing the location information as disk location information for the logical partition in the virtual machine;

outputting the location information for at least one virtual disk to a physical device;
acquiring disk numbers corresponding to the logical partitions, comprising:
  acquiring mounting statuses of the logical partitions within the virtual machine; and
  sequentially testing whether a mounting status of the logical partition is valid or invalid until testing of the logical partitions is completed, comprising:
    in the event that a mounting status of a currently tested logical partition is valid:
      opening a volume device object corresponding to the currently tested logical partition; and
      querying the volume device object to obtain a disk number corresponding to the currently tested logical partition; and
    in the event that the mounting status of the currently tested logical partition is invalid, testing whether a mounting status of a next logical partition is valid or invalid;
determining a third mapping relationship with the disk driver based on a disk number for the logical partition; and
determining a fourth mapping relationship with the disk adapter based on an instance name for the disk driver.

5. A method, comprising:
acquiring disk location information for logical partitions, the logical partitions pertaining to a virtual machine, wherein the disk location information corresponds to location information for virtual disks corresponding to the logical partitions; and wherein the acquiring of the disk location information for the logical partitions within the virtual machine comprises:
  acquiring mapping relationships pertaining to the virtual machine, the mapping relationships including first mapping relationships of a logical partition with a disk driver and second mapping relationships of the disk driver with a corresponding disk adapter, the disk driver being associated with a physical disk;
  determining, based on the mapping relationships, the disk driver having a first mapping relationship with the logical partition, and a disk adapter having a second mapping relationship with the disk driver, wherein:
    the logical partition comprises: a logical partition disk identifier and a logical partition disk number;
    the disk driver comprises: a logical partition disk number and a disk driver instance name; and
    the disk adapter comprises: a disk driver instance name and disk location information;
  determining a corresponding virtual disk of the logical partition in the virtual machine based on the disk adapter corresponding to the logical partition; and
  accessing location information for the virtual disk corresponding to the logical partition and providing the location information as disk location information for the logical partition in the virtual machine;
outputting the location information for at least one virtual disk to a physical device;
determining a third mapping relationship with the disk driver based on a disk number for the logical partition;
acquiring instance names of the disk drivers, comprising:
  acquiring a set of disk drivers in the virtual machine; and
  sequentially testing whether a disk driver is valid or invalid until testing of the set of disk drivers is completed, comprising:
    in the event that a currently tested disk driver is valid, acquiring an instance name corresponding to the currently tested disk driver; and
determining a fourth mapping relationship with the disk adapter based on an instance name for the disk driver.

6. A method, comprising:
acquiring disk location information for logical partitions, the logical partitions pertaining to a virtual machine, wherein the disk location information corresponds to location information for virtual disks corresponding to the logical partitions; and wherein the acquiring of the disk location information for the logical partitions within the virtual machine comprises:
  acquiring mapping relationships pertaining to the virtual machine, the mapping relationships including first mapping relationships of a logical partition with a disk driver and second mapping relationships of the disk driver with a corresponding disk adapter, the disk driver being associated with a physical disk;
  determining, based on the mapping relationships, the disk driver having a first mapping relationship with the logical partition, and a disk adapter having a second mapping relationship with the disk driver, wherein:
    the logical partition comprises: a logical partition disk identifier and a logical partition disk number;
    the disk driver comprises: a logical partition disk number and a disk driver instance name; and
    the disk adapter comprises: a disk driver instance name and disk location information;
  determining a corresponding virtual disk of the logical partition in the virtual machine based on the disk adapter corresponding to the logical partition; and
  accessing location information for the virtual disk corresponding to the logical partition and providing the location information as disk location information for the logical partition in the virtual machine;
outputting the location information for at least one virtual disk to a physical device;
determining a third mapping relationship with the disk driver based on a disk number for the logical partition;
acquiring instance names of a set of disk adapters, the set of disk adapters pertaining to the virtual machine, wherein the acquiring of the instance names of the set of disk adapters comprises:
  sequentially testing whether a disk adapter is valid or invalid until testing of the set of disk adapters is completed, comprising:
    in the event that a currently tested disk adapter is valid, acquiring an instance name corresponding to the currently tested disk adapter; and
determining a fourth mapping relationship with the disk adapter based on an instance name for the disk driver.

7. A system, comprising:
a processor; and
a memory coupled with the processor, wherein the memory is configured to provide the processor with instructions which when executed cause the processor to:
  acquire disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises to:

acquire mapping relationships pertaining to the virtual machine, the mapping relationships including first mapping relationships of a logical partition with a disk driver and second mapping relationships of the disk driver with a corresponding disk adapter, the disk driver being associated with a physical disk;

output the location information for at least one virtual disk to a physical device; and acquire disk numbers corresponding to the logical partitions, comprising to:

open a volume device object corresponding to the currently tested logical partition; and query the volume device object to obtain a disk number corresponding to the currently tested logical partition.

8. The system as described in claim 7, wherein the acquiring of the disk location information for the logical partitions within the virtual machine further comprises to:

determine, based on the mapping relationships, a disk driver having a first mapping relationship with a logical partition, and a disk adapter having a second mapping relationship with the disk driver;

determine a corresponding virtual disk of the logical partition in the virtual machine based on the disk adapter corresponding to the logical partition; and access location information for the virtual disk corresponding to the logical partition and provide the location information as disk location information for the logical partition in the virtual machine.

9. The system as described in claim 8, wherein:

the logical partition comprises: a logical partition disk identifier and a logical partition disk number;

the disk driver comprises: a logical partition disk number and a disk driver instance name;

the disk adapter comprises: a disk driver instance name and disk location information; and the processor is further configured to:

determine a third mapping relationship with the disk driver based on a disk number for the logical partition; and determine a fourth mapping relationship with the disk adapter based on an instance name for the disk driver.

10. A system, comprising:

a processor; and a memory coupled with the processor, wherein the memory is configured to provide the processor with instructions which when executed cause the processor to:

acquire disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises to:

acquire mapping relationships pertaining to the virtual machine, the mapping relationships including first mapping relationships of a logical partition with a disk driver and second mapping relationships of the disk driver with a corresponding disk adapter, the disk driver being associated with a physical disk;

determine, based on the mapping relationships, a disk driver having a first mapping relationship with the logical partition, and a disk adapter having a second mapping relationship with the disk driver, wherein:

the logical partition comprises: a logical partition disk identifier and a logical partition disk number;

the disk driver comprises: a logical partition disk number and a disk driver instance name; and the disk adapter comprises: a disk driver instance name and disk location information;

determine a corresponding virtual disk of the logical partition in the virtual machine based on the disk adapter corresponding to the logical partition; and access location information for the virtual disk corresponding to the logical partition and provide the location information as disk location information for the logical partition in the virtual machine;

output the location information for at least one virtual disk to a physical device;

acquire disk numbers corresponding to the logical partitions, comprising to:

acquire mounting statuses of the logical partitions within the virtual machine; and sequentially test whether a mounting status of the logical partition is valid or invalid until testing of the logical partitions is completed, comprising to:

in the event that a mounting status of a currently tested logical partition is valid:

open a volume device object corresponding to the currently tested logical partition; and query the volume device object to obtain a disk number corresponding to the currently tested logical partition; and in the event that the mounting status of the currently tested logical partition is invalid, test whether a mounting status of a next logical partition is valid or invalid;

determine a third mapping relationship with the disk driver based on a disk number for each logical partition; and determine a fourth mapping relationship with the disk adapter based on an instance name for each disk driver.

11. A system, comprising:

a processor; and a memory coupled with the processor, wherein the memory is configured to provide the processor with instructions which when executed cause the processor to:

acquire disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises to:

acquire mapping relationships pertaining to the virtual machine, the mapping relationships including first mapping relationships of a logical partition with a disk driver and second mapping relationships of the disk driver with a corresponding disk adapter, the disk driver being associated with a physical disk;

determine, based on the mapping relationships, a disk driver having a first mapping relationship with the logical partition, and a disk adapter having a second mapping relationship with the disk driver, wherein:
the logical partition comprises: a logical partition disk identifier and a logical partition disk number;
the disk driver comprises: a logical partition disk number and a disk driver instance name; and
the disk adapter comprises: a disk driver instance name and disk location information;
determine a corresponding virtual disk of the logical partition in the virtual machine based on the disk adapter corresponding to the logical partition; and
access location information for the virtual disk corresponding to the logical partition and provide the location information as disk location information for the logical partition in the virtual machine;
output the location information for at least one virtual disk to a physical device;
determine a third mapping relationship with the disk driver based on a disk number for each logical partition;
acquire instance names of the disk drivers, comprising to:
acquire a set of disk drivers in the virtual machine; and
sequentially test whether a disk driver is valid or invalid until testing of the set of disk drivers is completed, comprising to:
in the event that a currently tested disk driver is valid, acquire an instance name corresponding to the currently tested disk driver; and
determine a fourth mapping relationship with the disk adapter based on an instance name for each disk driver.

12. A system, comprising:
a processor; and
a memory coupled with the processor, wherein the memory is configured to provide the processor with instructions which when executed cause the processor to:
acquire disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises to:
acquire mapping relationships pertaining to the virtual machine, the mapping relationships including first mapping relationships of a logical partition with a disk driver and second mapping relationships of the disk driver with a corresponding disk adapter, the disk driver being associated with a physical disk;
determine, based on the mapping relationships, a disk driver having a first mapping relationship with the logical partition, and a disk adapter having a second mapping relationship with the disk driver, wherein:
the logical partition comprises: a logical partition disk identifier and a logical partition disk number;
the disk driver comprises: a logical partition disk number and a disk driver instance name; and
the disk adapter comprises: a disk driver instance name and disk location information;
determine a corresponding virtual disk of the logical partition in the virtual machine based on the disk adapter corresponding to the logical partition; and
access location information for the virtual disk corresponding to the logical partition and provide the location information as disk location information for the logical partition in the virtual machine;
output the location information for at least one virtual disk to a physical device to the physical device;
determine a third mapping relationship with the disk driver based on a disk number for each logical partition;
acquire instance names of a set of disk adapters, the set of disk adapters pertaining to the virtual machine, wherein the acquiring of the instance names of the set of disk adapters comprises to:
sequentially test whether a disk adapter is valid or invalid until testing of the set of disk adapters is completed, comprising to:
in the event that a currently tested disk adapter is valid, acquire an instance name corresponding to the currently tested disk adapter; and
determine a fourth mapping relationship with the disk adapter based on an instance name for each disk driver.

13. A computer program product being embodied in a non-transitory computer readable medium and comprising computer instructions for:
acquiring disk location information for logical partitions, the logical partitions pertaining to a virtual machine, wherein the disk location information corresponds to location information for virtual disks corresponding to the logical partitions, wherein the acquiring of the disk location information for the logical partitions within the virtual machine comprises:
acquiring mapping relationships pertaining to the virtual machine, the mapping relationships including first mapping relationships of a logical partition with a disk driver and second mapping relationships of the disk driver with a corresponding disk adapter, the disk driver being associated with a physical disk;
outputting the location information for at least one virtual disk to a physical device; and
acquiring disk numbers corresponding to the logical partitions, comprising:
opening a volume device object corresponding to the currently tested logical partition; and
querying the volume device object to obtain a disk number corresponding to the currently tested logical partition.

* * * * *